(12) United States Patent
Bir et al.

(10) Patent No.: US 10,235,336 B1
(45) Date of Patent: Mar. 19, 2019

(54) PRESCRIPTIVE ANALYTICS PLATFORM AND POLARITY ANALYSIS ENGINE

(71) Applicant: Compellon Inc., Rancho Santa Margarita, CA (US)

(72) Inventors: Adrian Marc Bir, Irvine, CA (US); Nikolai Nikolaevich Liachenko, Porter Ranch, CA (US); Daniel Brooks Presley, Aliso Viejo, CA (US)

(73) Assignee: COMPELLON INCORPORATED, Laguna Hills, CA (US)

( * ) Notice: Subject to any disclaimer, the term of this patent is extended or adjusted under 35 U.S.C. 154(b) by 299 days.

(21) Appl. No.: 15/266,992

(22) Filed: Sep. 15, 2016

Related U.S. Application Data

(60) Provisional application No. 62/394,657, filed on Sep. 14, 2016.

(51) Int. Cl.
| | | |
|---|---|---|
| *G06F 17/30* | (2006.01) | |
| *G06F 16/2457* | (2019.01) | |
| *G06F 16/2455* | (2019.01) | |
| *G06F 16/33* | (2019.01) | |

(52) U.S. Cl.
CPC .... *G06F 16/24578* (2019.01); *G06F 16/2455* (2019.01); *G06F 16/3344* (2019.01); *G06F 17/3053* (2013.01); *G06F 17/30477* (2013.01); *G06F 17/30684* (2013.01)

(58) Field of Classification Search
CPC ............. G06F 17/3053; G06F 16/2455; G06F 16/24578; G06F 16/3344; G06F 17/03–17/477

USPC ......................................................... 707/723
See application file for complete search history.

(56) References Cited

U.S. PATENT DOCUMENTS

| | | | | | |
|---|---|---|---|---|---|
| 4,887,212 | A * | 12/1989 | Zamora | ............... | G06F 17/2705 704/8 |
| 6,308,149 | B1 * | 10/2001 | Gaussier | ............. | G06F 17/2755 704/9 |
| 6,446,035 | B1 * | 9/2002 | Grefenstette | .......... | G06Q 30/02 704/1 |
| 8,265,925 | B2 * | 9/2012 | Aarskog | ............... | G06F 17/271 704/1 |
| 8,311,863 | B1 * | 11/2012 | Kemp | ................ | G06Q 10/0639 705/7.11 |
| 8,918,312 | B1 * | 12/2014 | Rehling | .............. | G06F 17/2785 704/9 |
| 9,311,416 | B1 * | 4/2016 | Goel | ................... | G06F 17/3087 |
| 9,633,007 | B1 * | 4/2017 | Brun | ................... | G06F 17/2785 |
| 9,658,824 | B1 * | 5/2017 | Shao | ......................... | G06F 7/00 |

(Continued)

*Primary Examiner* — Mark E Hershley
(74) *Attorney, Agent, or Firm* — Knobbe, Martens, Olson & Bear, LLP

(57) ABSTRACT

Embodiments of the systems and methods disclosed herein provide a prescriptive analytics platform and polarity analysis engine in which a user can identify a target objective and use the system to find out whether the user's objectives are being met, what predictive factors are positively or negatively affecting the targeted objectives, as well as what recommended changes the user can make to better meet the objectives. The systems and methods may include a polarity analysis engine configured to determine the polarity of terms in free-text input in view of the target objective and the predictive factors and use the polarity to generate the recommended changes.

24 Claims, 36 Drawing Sheets
(28 of 36 Drawing Sheet(s) Filed in Color)

(56) References Cited

U.S. PATENT DOCUMENTS

| | | | |
|---|---|---|---|
| 2003/0023435 A1* | 1/2003 | Josephson | G10L 15/26 704/235 |
| 2005/0108001 A1* | 5/2005 | Aarskog | G06F 17/271 704/10 |
| 2005/0228640 A1* | 10/2005 | Aue | G06F 17/2818 704/9 |
| 2006/0229896 A1* | 10/2006 | Rosen | G06Q 10/10 705/321 |
| 2007/0255702 A1* | 11/2007 | Orme | G06F 17/30696 |
| 2008/0086363 A1* | 4/2008 | Kass | G06Q 10/04 705/7.29 |
| 2011/0043652 A1* | 2/2011 | King | G06F 17/2211 348/222.1 |
| 2013/0091139 A1* | 4/2013 | Rajpathak | G06F 17/2785 707/740 |
| 2013/0273968 A1* | 10/2013 | Rhoads | G06F 17/30244 455/556.1 |
| 2013/0325877 A1* | 12/2013 | Niazi | G06Q 30/0203 707/748 |
| 2014/0075004 A1* | 3/2014 | Van Dusen | H04L 41/04 709/223 |
| 2014/0164502 A1* | 6/2014 | Khodorenko | H04L 67/306 709/204 |
| 2014/0164530 A1* | 6/2014 | Stoertenbecker | H04L 51/32 709/206 |
| 2014/0201126 A1* | 7/2014 | Zadeh | G06K 9/627 706/52 |
| 2014/0237057 A1* | 8/2014 | Khodorenko | H04L 51/32 709/206 |
| 2015/0066807 A1* | 3/2015 | Cohen | G06Q 30/0282 705/347 |
| 2016/0042359 A1* | 2/2016 | Singh | G06Q 30/016 704/2 |
| 2017/0017971 A1* | 1/2017 | Moreau | G06Q 30/0202 |
| 2017/0300499 A1* | 10/2017 | Lev-Tov | G06F 17/3069 |

* cited by examiner

Review Survey Dataset

| Exclude | Pos | Question | | Empty | Unique Values |
|---|---|---|---|---|---|
| ☐ | 0 | Q1 : Which best characterizes the purpose of your stay? | ≡ | 0.00% | 8 |
| ☐ | 1 | Q2 : How many nights was your stay? | ≡ | 38.62% | 13 |
| ☐ | 10 | Q5 : What is your age? | ≡ | 2.37% | 69 |
| ☐ | 11 | Q6 : Which categorizes your household income? | ≡ | 19.92% | 5 |
| ☐ | 12 | Q7 : What is your gender? | ≡ | 4.73% | 3 |
| ☐ | 13 | Q8 : On average, how many nights per month do you spend... | ≡ | 25.99% | 9 |
| ☐ | 14 | Q9 : How would you rate your overall satisfaction with your... | ≡ | 0.00% | 11 |
| ☐ | 2 | Q3_1 : How easy was it for you to--Get to the hotel | ≡ | 35.16% | 6 |
| ☐ | 3 | Q3_2 : How easy was it for you to--Check in | ≡ | 12.50% | 6 |
| ☐ | 4 | Q3_3 : How easy was it for you to--Find your room | ≡ | 3.56% | 6 |

PRESCRIPTIVE ANALYTICS PLATFORM AND POLARITY ANALYSIS ENGINE

RELATED APPLICATIONS

This application claims the benefit of U.S. Patent Provisional Application No. 62/394,657, filed Sep. 14, 2016, the entire content of which is hereby expressly incorporated by reference herein in its entirety and for all purposes. In addition, any and all applications for which a foreign or domestic priority claim is identified in the application data sheet as filed with the present application are also expressly incorporated by reference.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND OF THE DISCLOSURE

The systems and methods relate generally to the field of analyzing structured and free text data sets.

SUMMARY OF EXAMPLE EMBODIMENTS

Various systems and methods for providing a prescriptive analytics and platform are disclosed, which include a polarity analysis engine configured to determine the polarity of terms in free-text input in view of a target objective and predictive factors and use the polarity to generate recommended changes. The systems, methods, and devices of the disclosure each have several innovative aspects, no single one of which is solely responsible for the desirable attributes disclosed herein.

One embodiment of a prescriptive analytics system for conducting a polarity analysis on unstructured, free text data is disclosed. The prescriptive analytics system may comprise: a first electronic database storing a set of response data, the set of response data comprising a structured data set and a free text data set; a second electronic database storing a first objective corresponding to the set of response data, the first objective selected by a user; a hardware processor is configured to execute computer-executable instructions in order to: access from the first electronic database the set of response data; analyze the structured data set to identify key predictive factors within the structured data set that have a statistically significant correlation to the first objective; generate a correlated structured data set from the structured data set using the identified key predictive factors; convert terms within the free text data set into their lemma standard form to generate a standardized lemma data set; filter the standardized lemma data set to remove terms that are not associated with actionable words to create a filtered lemma data set; aggregate the filtered lemma data set with the correlated structured data set; generate scores for the filtered lemma data set in view of the first objective to create a scored lemma data set; analyze the distribution of the scored lemma data set against a distribution of the first objective in the correlated structured data set; balance the distribution of the scored lemma data set against rarity and aggregate frequency of terms in the scored lemma data set to create a distributed lemma data set; and assign polarity values to terms in the distributed lemma data set, wherein the polarity values indicate whether each of the terms is a positive term or a negative term.

One embodiment of a computer-implemented method of conducting a polarity analysis on unstructured, free text data is disclosed. The computer-implemented method may comprise: as implemented by one or more computing devices configured with specific computer-executable instructions, accessing from a first electronic database a set of response data that includes a structured data set and an unstructured data set; analyzing the structured data set to identify key predictive factors within the structured data set that have a statistically significant correlation to the first objective; generating a correlated structured data set from the structured data set using the identified key predictive factors; converting terms within the free text data set into their lemma standard form to generate a standardized lemma data set; filtering the standardized lemma data set to remove terms that are not associated with actionable words to create a filtered lemma data set; aggregating the filtered lemma data set with the correlated structured data set; generating scores for the filtered lemma data set in view of the first objective to create a scored lemma data set; analyzing the distribution of the scored lemma data set against a distribution of the first objective in the correlated structured data set; balancing the distribution of the scored lemma data set against rarity and aggregate frequency of terms in the scored lemma data set to create a distributed lemma data set; and assigning polarity values to terms in the distributed lemma data set, wherein the polarity values indicate whether each of the terms is a positive term or a negative term.

One embodiment of a non-transitory computer storage having stored thereon a computer program, the computer program including executable instructions that instruct a computer system is disclosed. The non-transitory computer storage may instruct a computer system to at least: access from a first electronic database a set of response data that includes a structured data set and an unstructured data set; analyze the structured data set to identify key predictive factors within the structured data set that have a statistically significant correlation to the first objective; generate a correlated structured data set from the structured data set using the identified key predictive factors; convert terms within the free text data set into their lemma standard form to generate a standardized lemma data set; filter the standardized lemma data set to remove terms that are not associated with actionable words to create a filtered lemma data set; aggregate the filtered lemma data set with the correlated structured data set; generate scores for the filtered lemma data set in view of the first objective to create a scored lemma data set; analyze the distribution of the scored lemma data set against a distribution of the first objective in the correlated structured data set; balance the distribution of the scored lemma data set against rarity and aggregate frequency of terms in the scored lemma data set to create a distributed lemma data set; and assign polarity values to terms in the distributed lemma data set, wherein the polarity values indicate whether each of the terms is a positive term or a negative term.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

The patent or application file contains at least one drawing executed in color. Copies of this patent or patent application publication with color drawings will be provided by the Office upon request and payment of the necessary fee.

Throughout the drawings, reference numbers are re-used to indicate correspondence between referenced elements. The drawings are provided to illustrate embodiments of the subject matter described herein and not to limit the scope thereof.

Figure 1A:
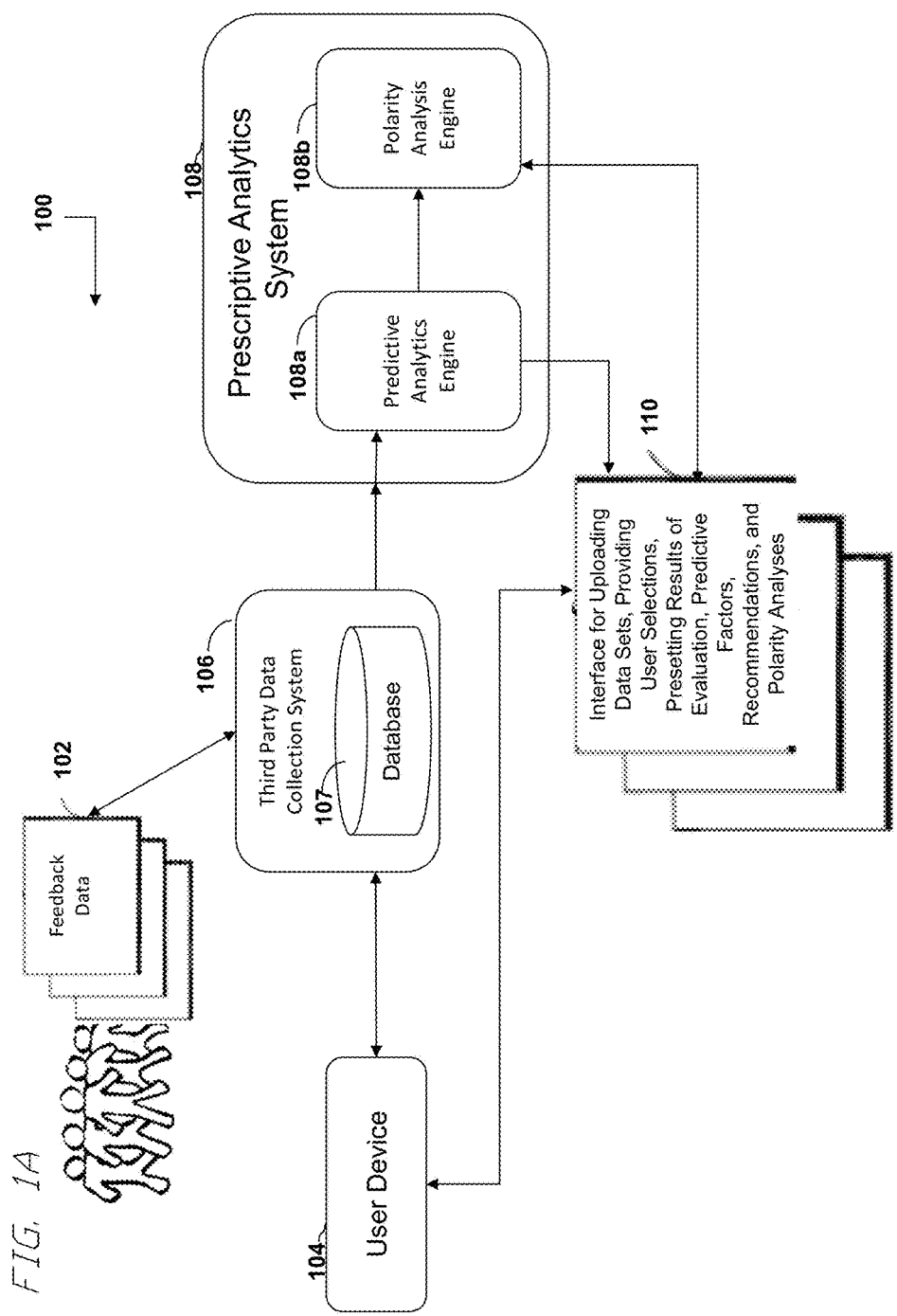

FIG. 1A is a block diagram of a computing environment that includes a User Device, a Third Party Data Collection System, and a Prescriptive Analytics System, according to one embodiment.

Figure 1B:
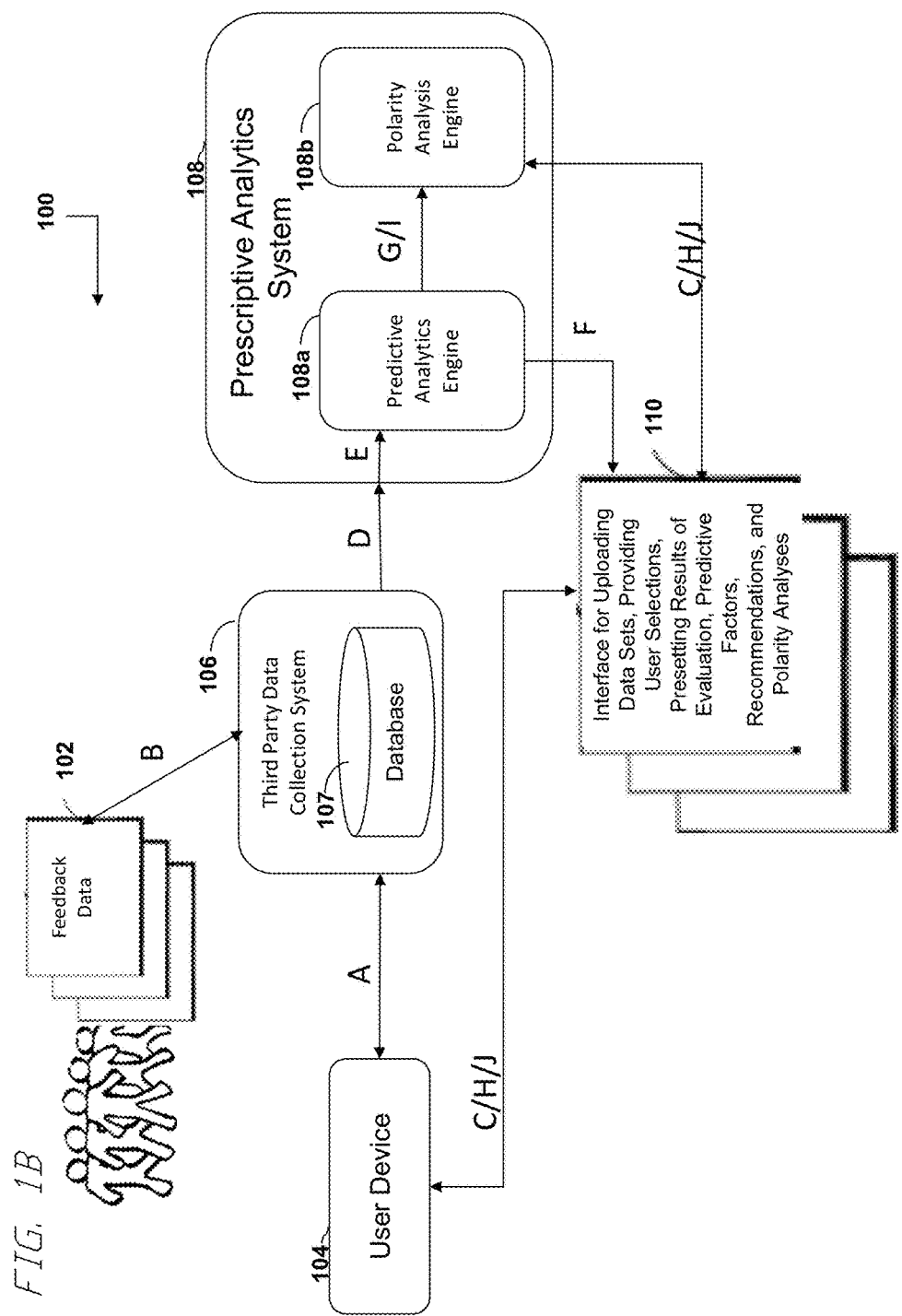

FIG. 1B is a block diagram showing the embodiment of FIG. 1A and an exemplary data flow among the User Device, the Third Party Data Collection System, and the Prescriptive Analytics System, according to one embodiment.

Figure 2:
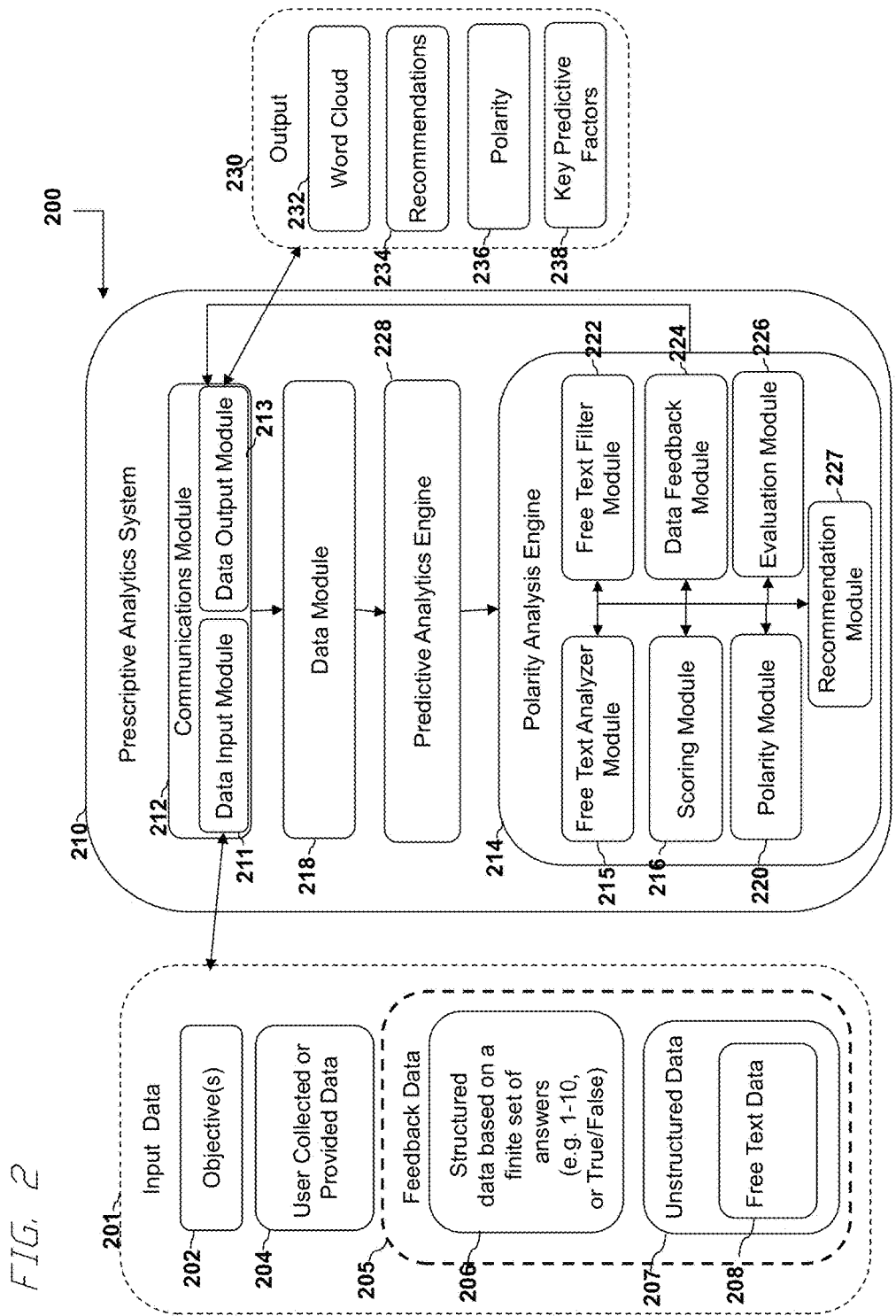

FIG. 2 is a block diagram showing one embodiment in which Prescriptive Analytics System and its components process inputs and provide outputs.

Figure 3:
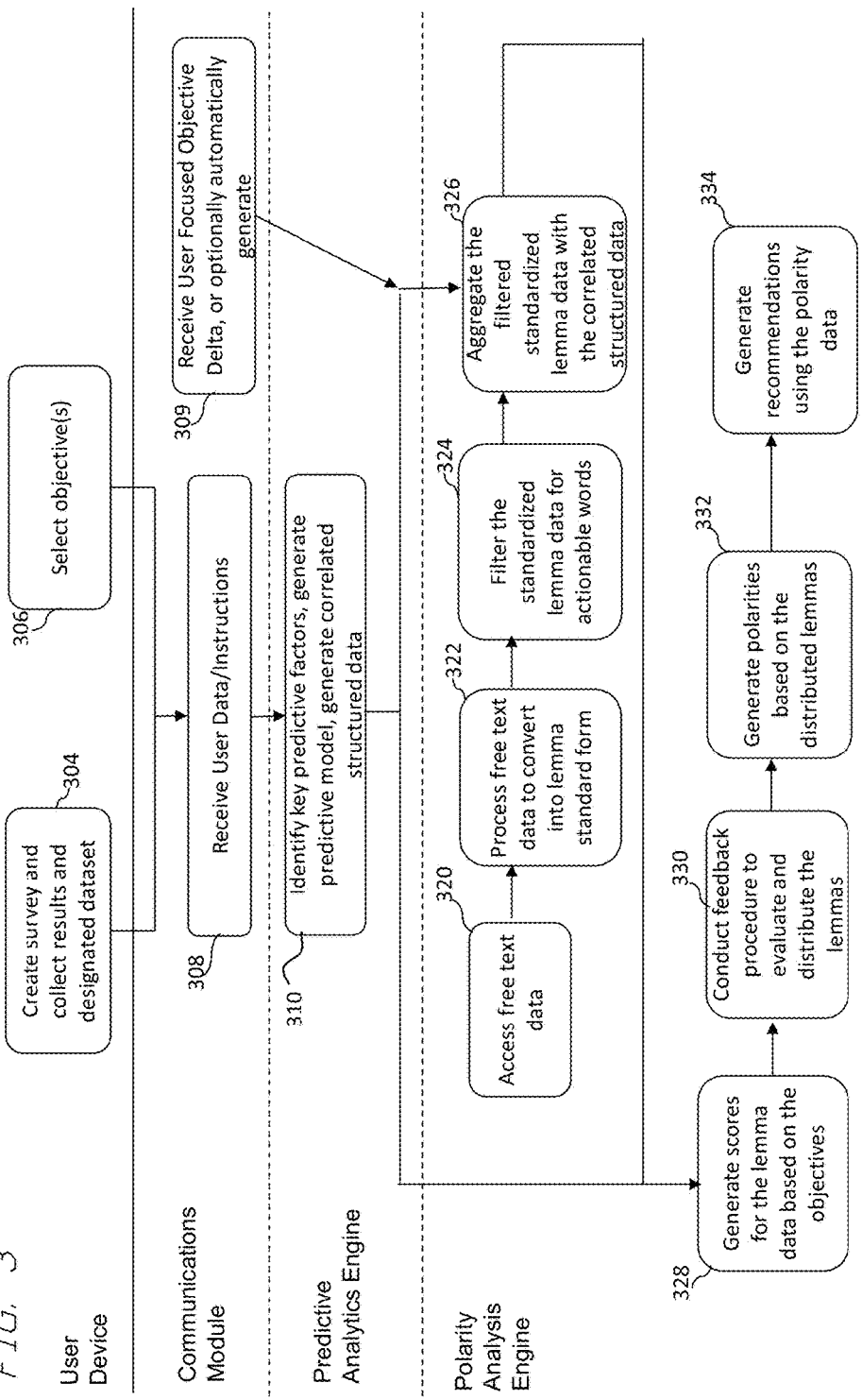

FIG. 3 is a block diagram which illustrates a logical flow diagram for one embodiment of an example process for conducting a polarity analysis.

Figure 4:
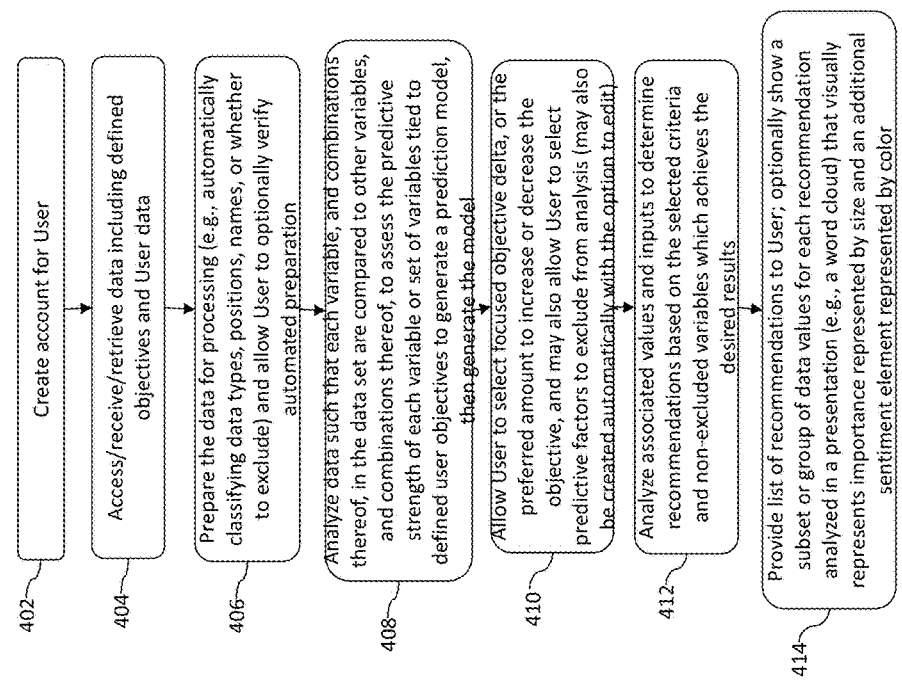

FIG. 4 schematically illustrates a logical flow diagram for one embodiment of an example process for performing one feature of the Prescriptive Analytics System to generate and provide a list of recommendations to achieve a designated amount to change an objective.

Figure 5:
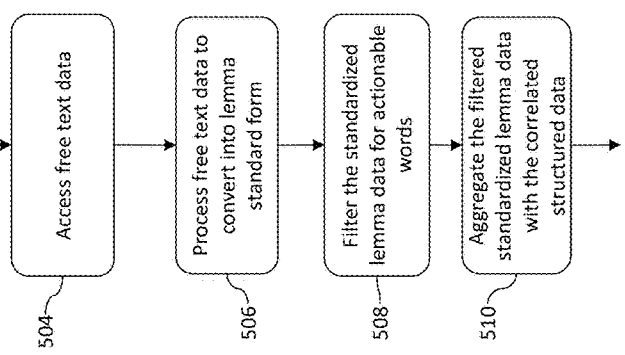

FIG. 5 schematically illustrates a logical flow diagram for one embodiment of an example process for processing free text data.

Figure 6:
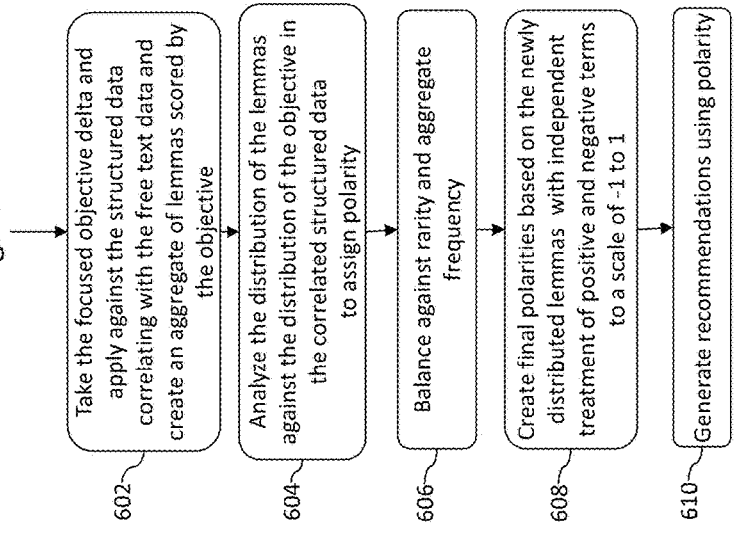

FIG. 6 schematically illustrates a logical flow diagram for one embodiment of an example process for analyzing and processing data and generating recommendations.

Figure 7:
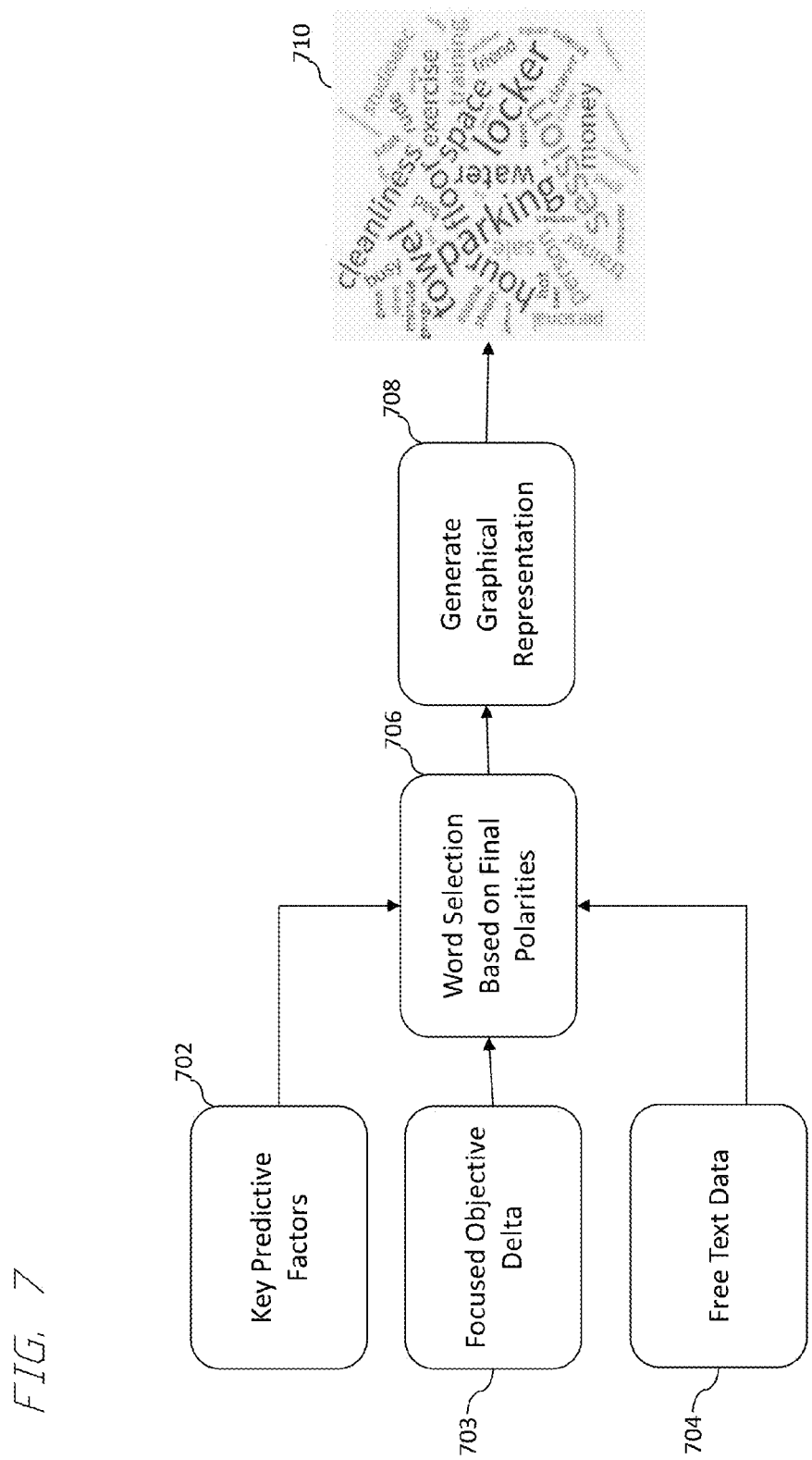

FIG. 7 is a block diagram showing one embodiment of an example process for analyzing key predictive factors, a focused objective delta, and free text data to generate a graphical representation of words based on their predictive nature and polarities.

Figure 8:
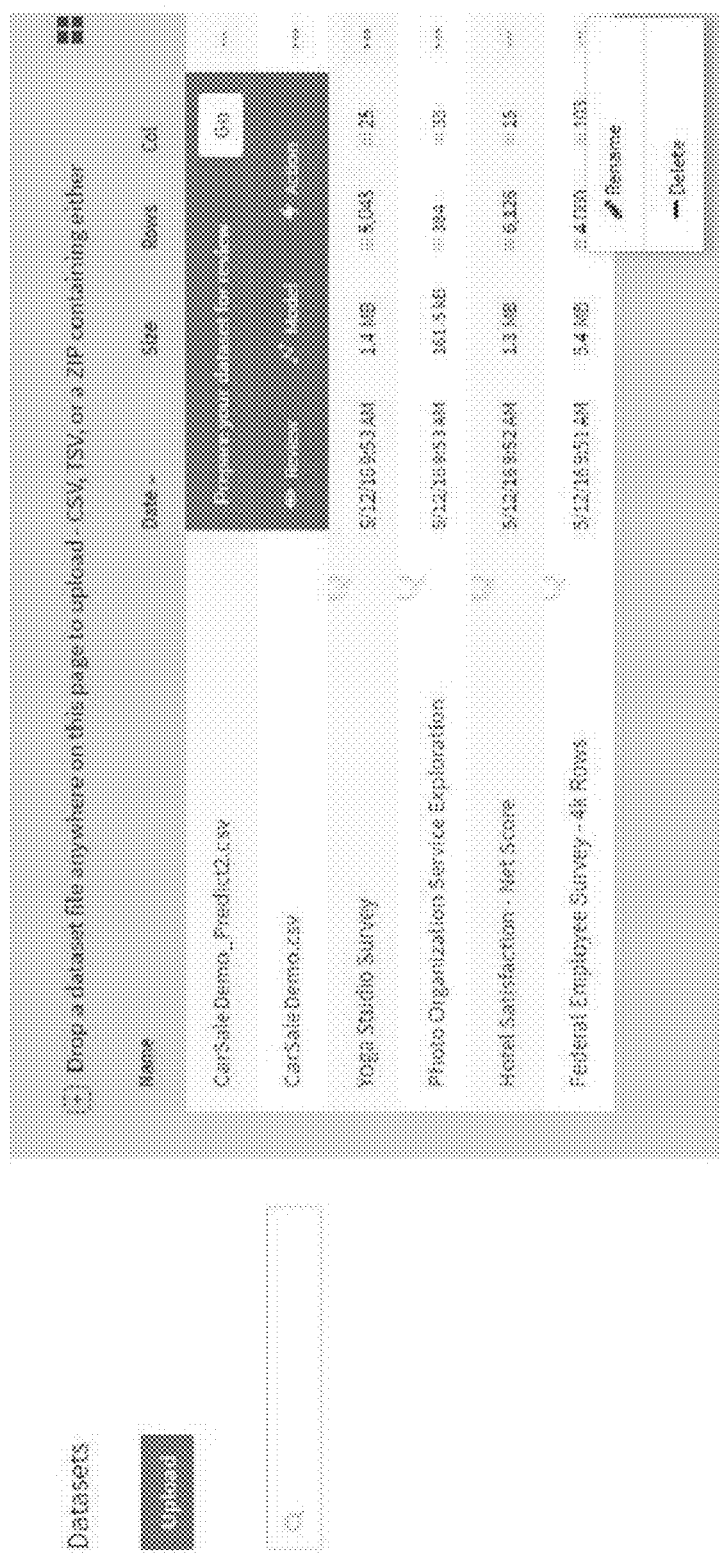

FIG. 8 is a screen shot depicting one embodiment of an example user interface that generates a graphical depiction of various datasets associated with a specific account.

Figure 9:
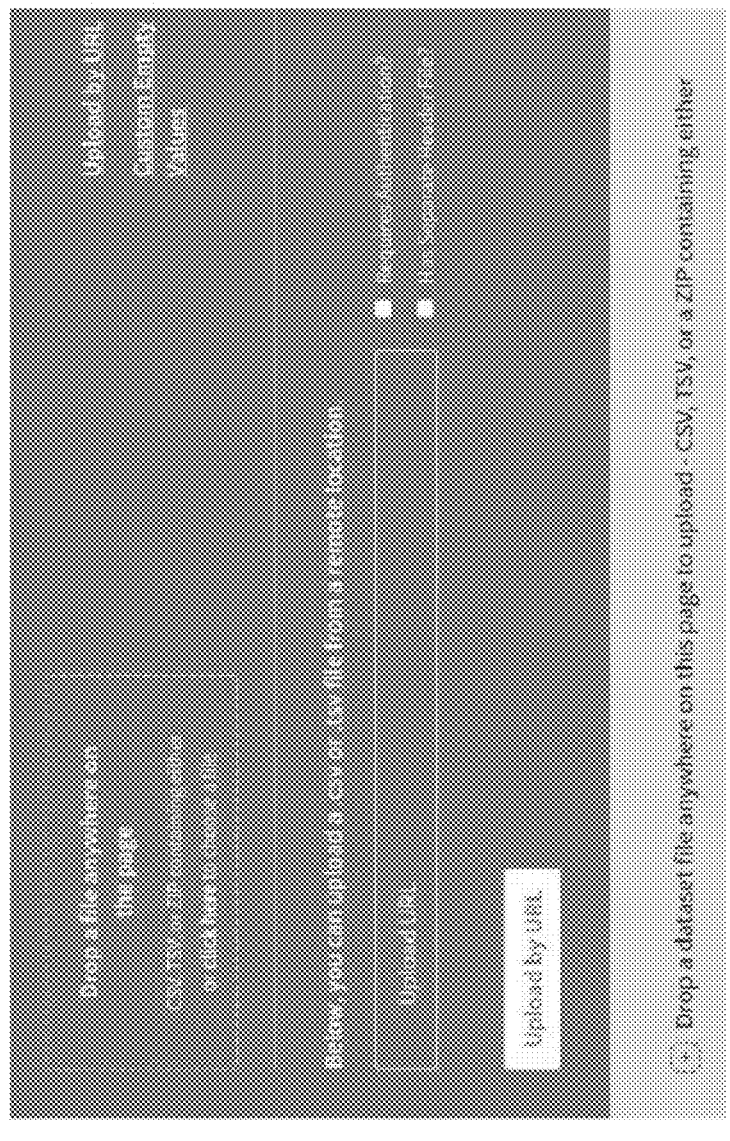

FIG. 9 is a screen shot depicting one embodiment of an example user interface, allowing for uploading data or directing the system to a remote location where data is located and available for the system to download.

FIG. 10 is a screen shot depicting one embodiment of an example user interface, displaying the details of data automatically classified, but also allowing for additional classification and customization as well as the creation and utilization of a schema.

Figure 11:
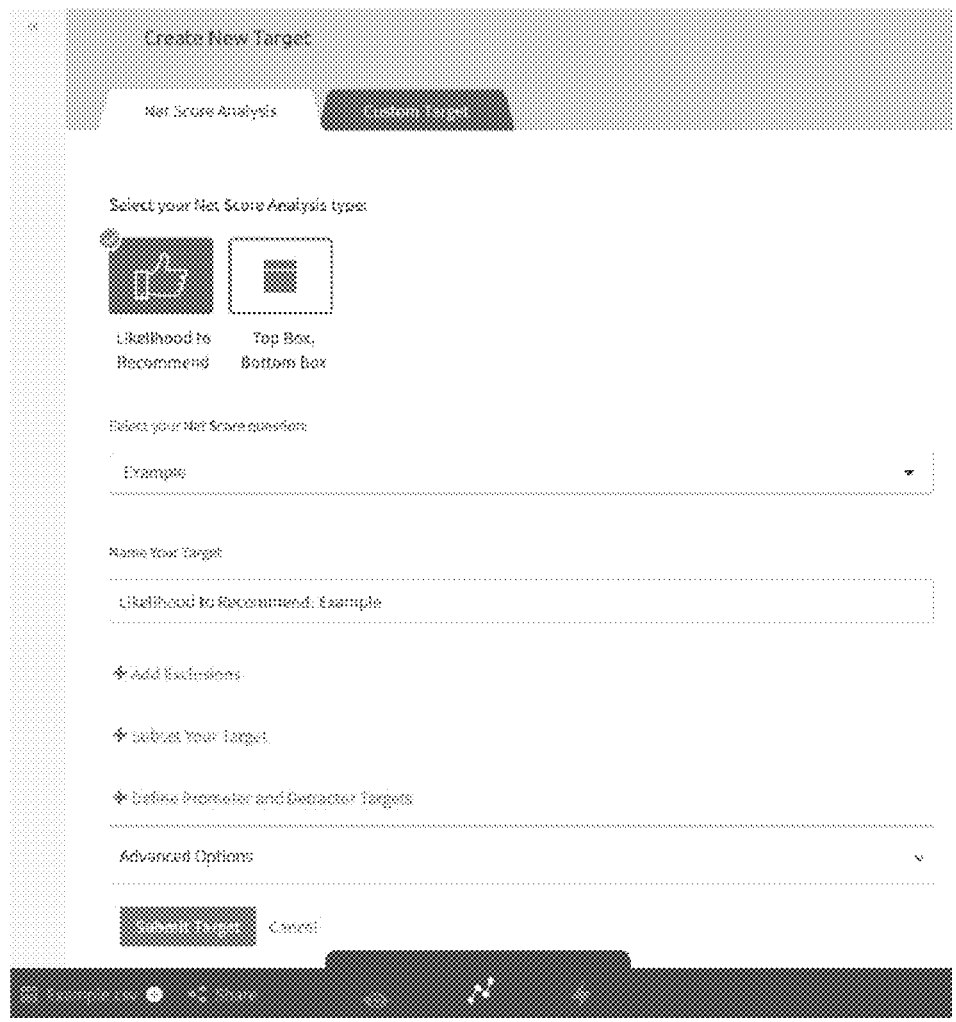

FIG. 11 is a screen shot depicting one embodiment of an example user interface, allowing for the input of pre-set criteria to analyze data with additional customizations.

Figure 12:
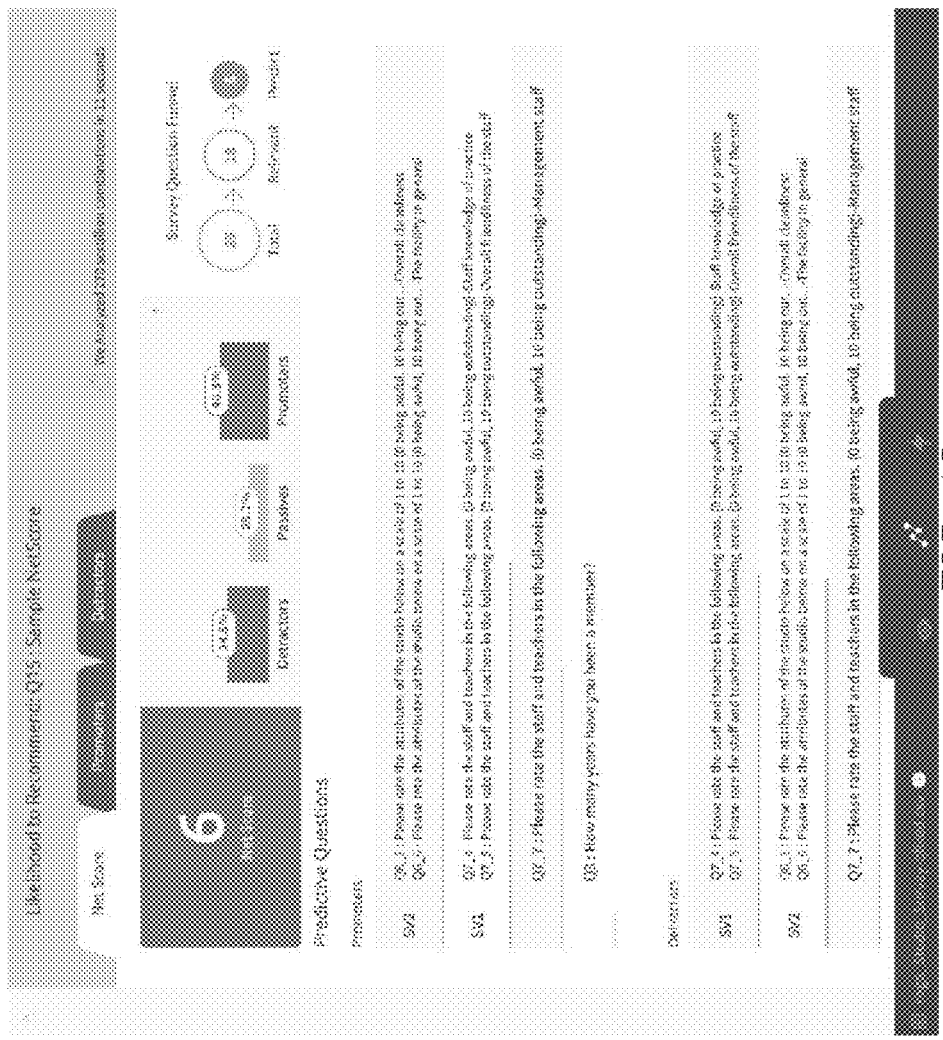

FIG. 12 is a screen shot depicting one embodiment of an example user interface that generates a graphical depiction of the results of an analysis.

Figure 13A:
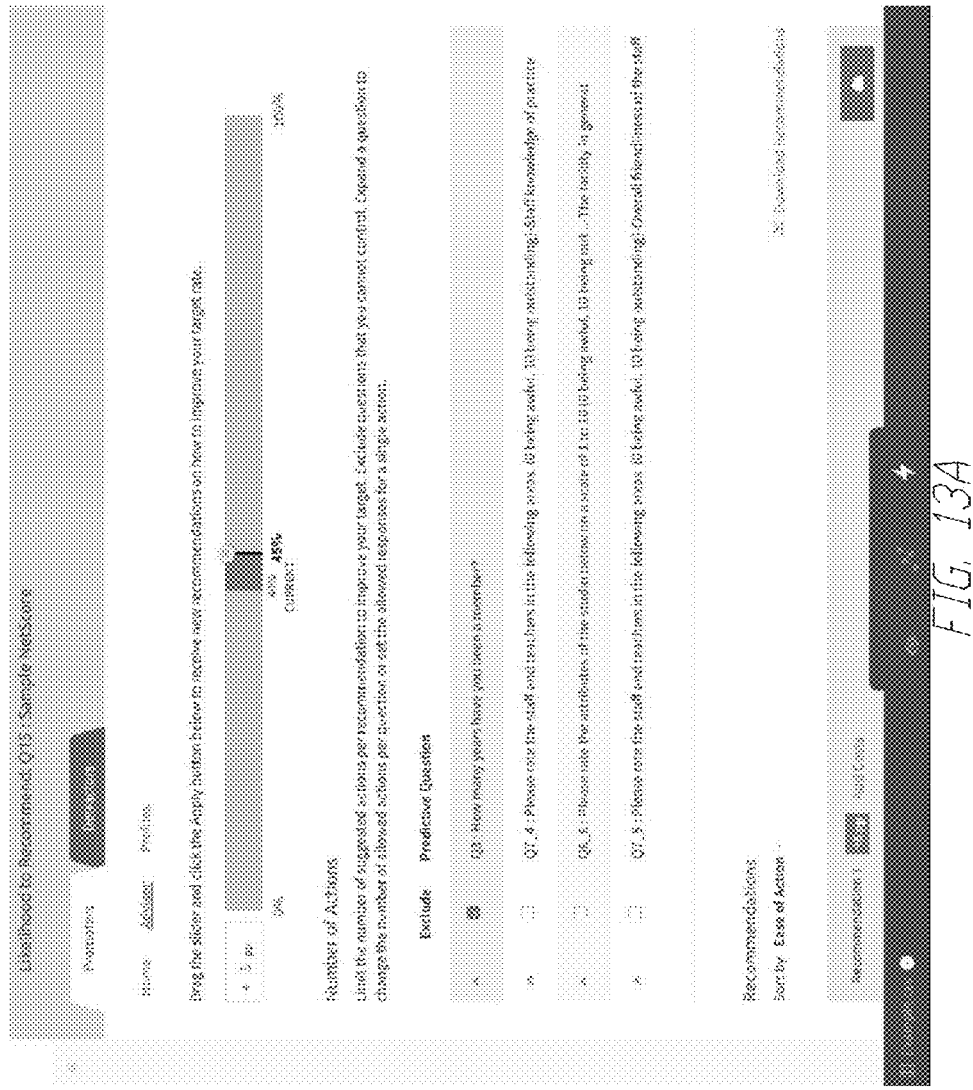

FIG. 13A is a screen shot depicting one embodiment of an example user interface, allowing for the setting of a goal based on focused elements of data and recommendations based on set configuration.

Figure 13B:

FIG. 13B is a screen shot depicting one embodiment of an example user interface, similar to FIG. 13A, showing multiple possible recommendations to achieve the goal set out.

Figure 13C:
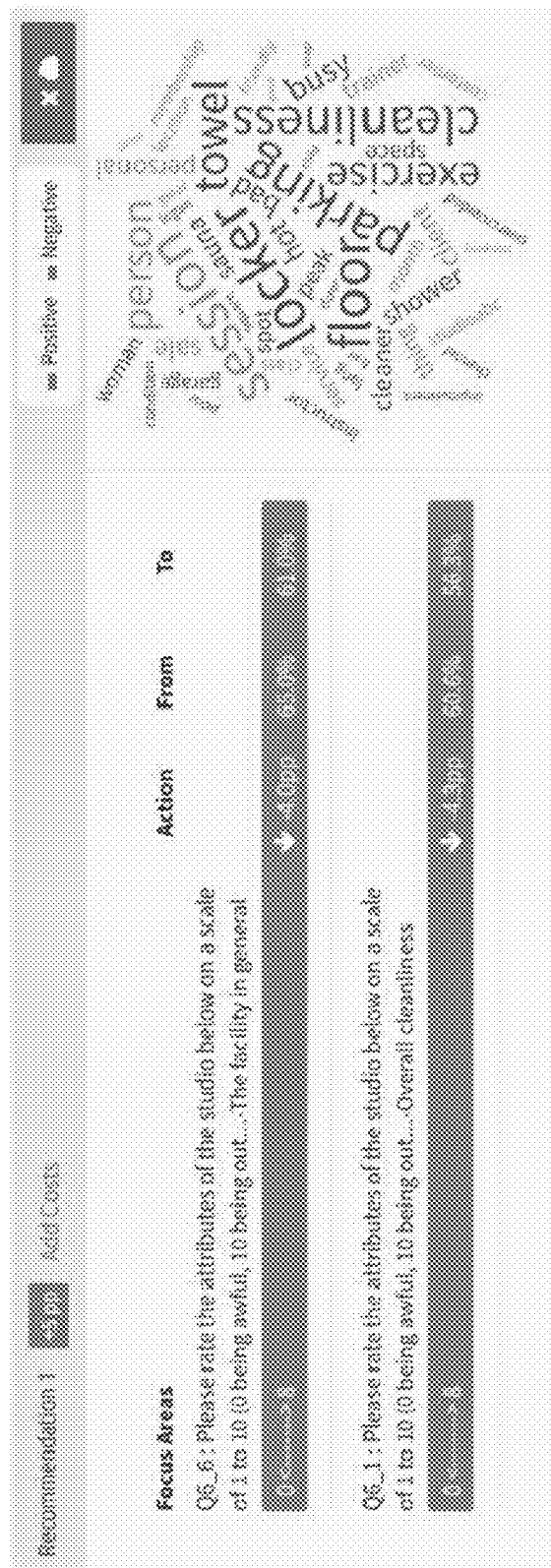

FIG. 13C is a screen shot depicting one embodiment of an example user interface, similar to FIG. 13B, showing a word cloud representing the predictive nature of the language and sentiment pertaining to a specific recommendation.

Figure 14:
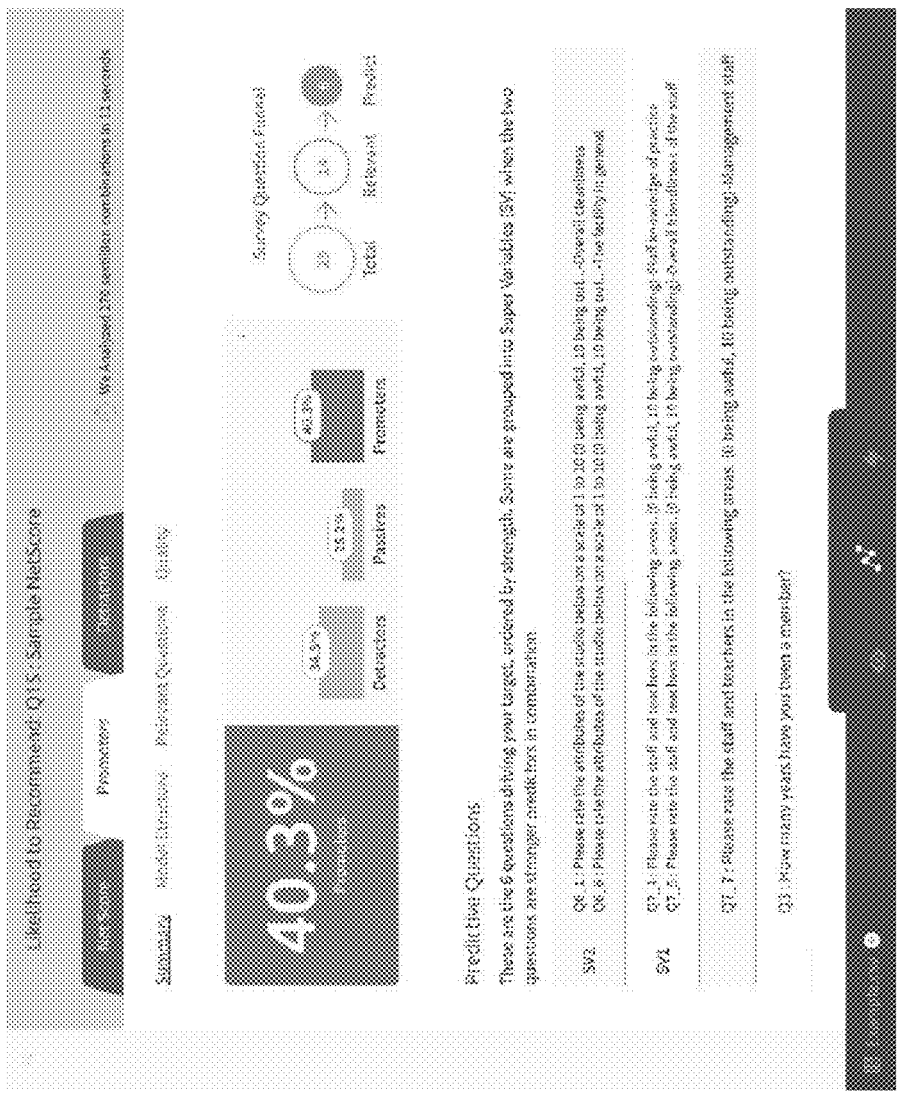

FIG. 14 is a screen shot depicting one embodiment of an example user interface that generates a graphical depiction of the results of an analysis with respect to promoters related to set criteria.

Figure 15:
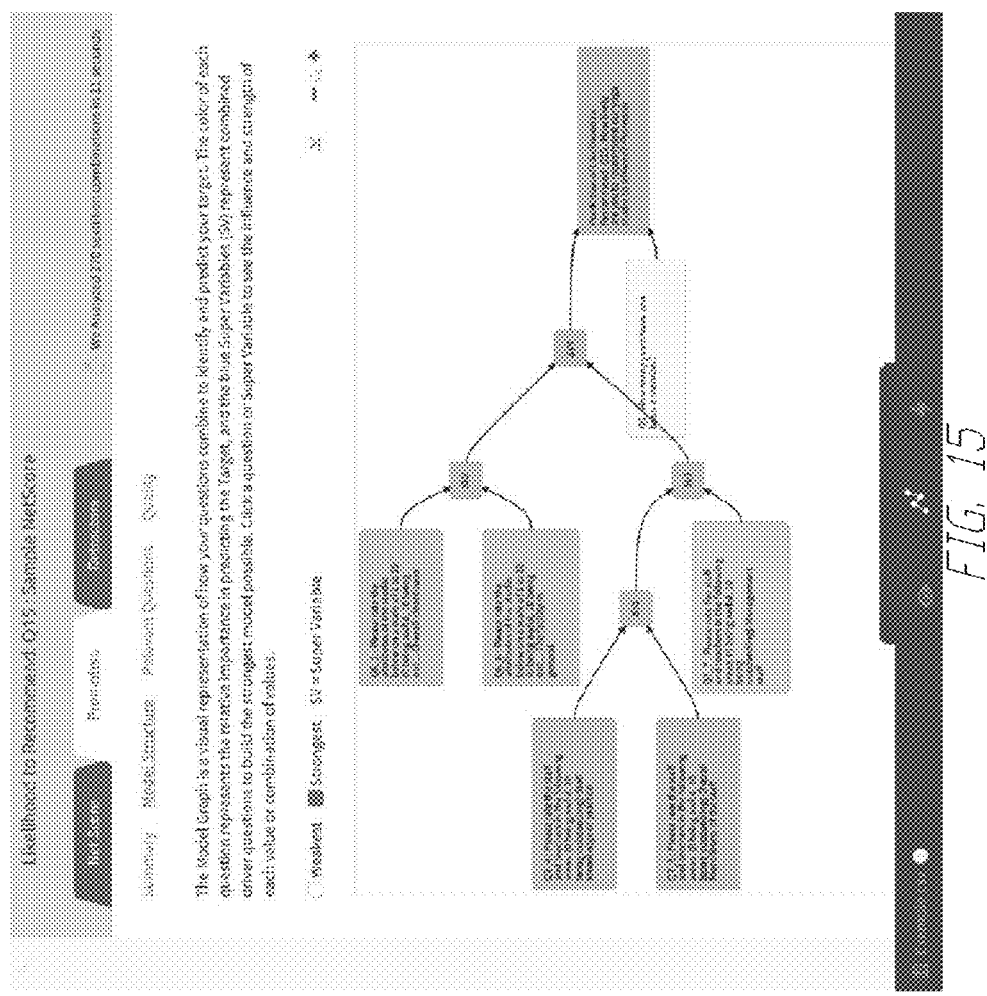

FIG. 15 is a screen shot depicting one embodiment of an example user interface that generates a graphical depiction of predictive details of an analysis pertaining to promoters, also illustrated by an image where certain data points hold more or less predictive value based on color and combination.

Figure 16:
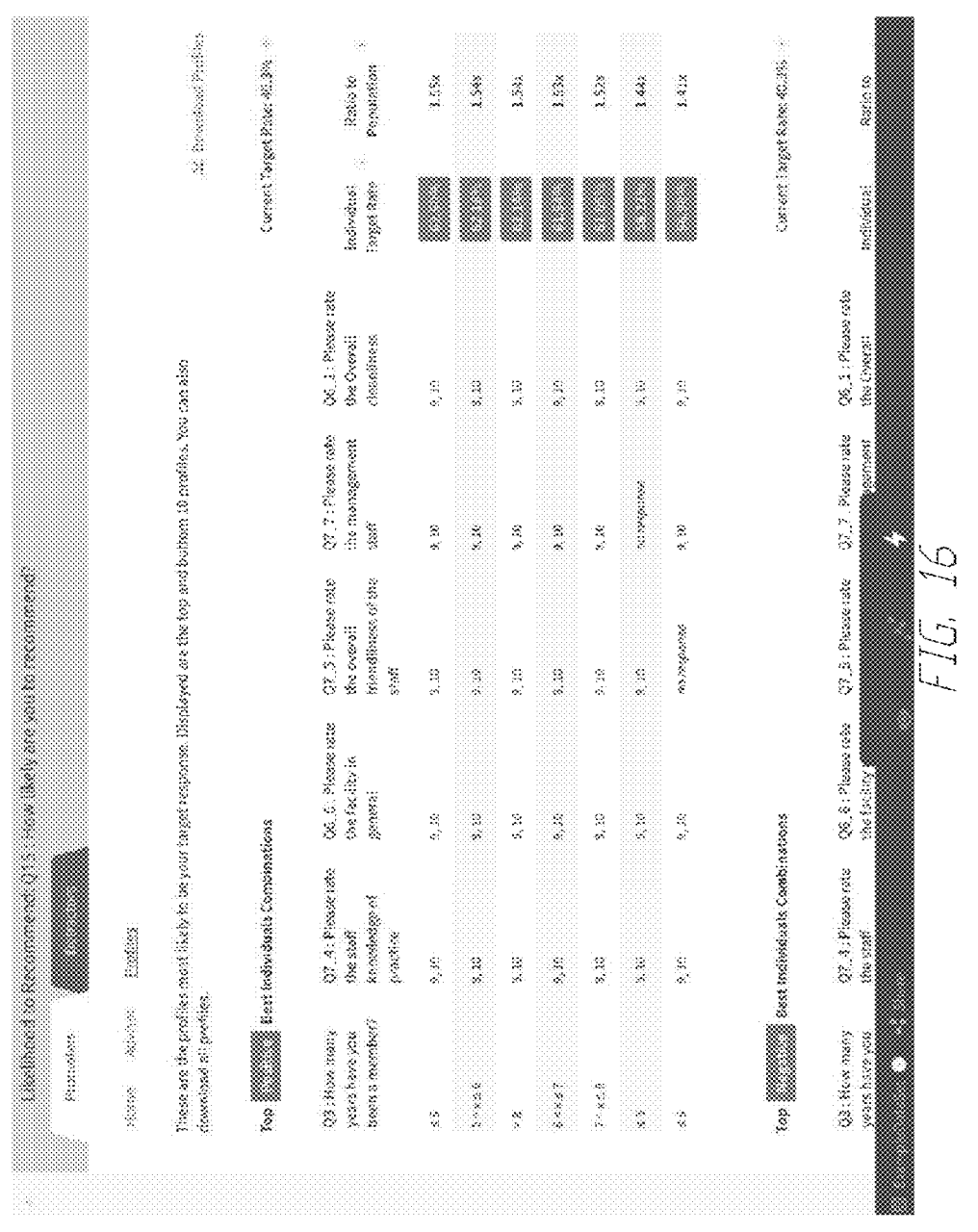

FIG. 16 is a screen shot depicting one embodiment of an example user interface that generates a graphical depiction of specific profiles of most positive and most negative characteristics of individuals in a data set pertaining to the promoter analysis.

Figure 17:

FIG. 17 is a screen shot depicting one embodiment of an example user interface that generates a graphical depiction of how data correlates with a positive or negative influence on an objective.

Figure 18:
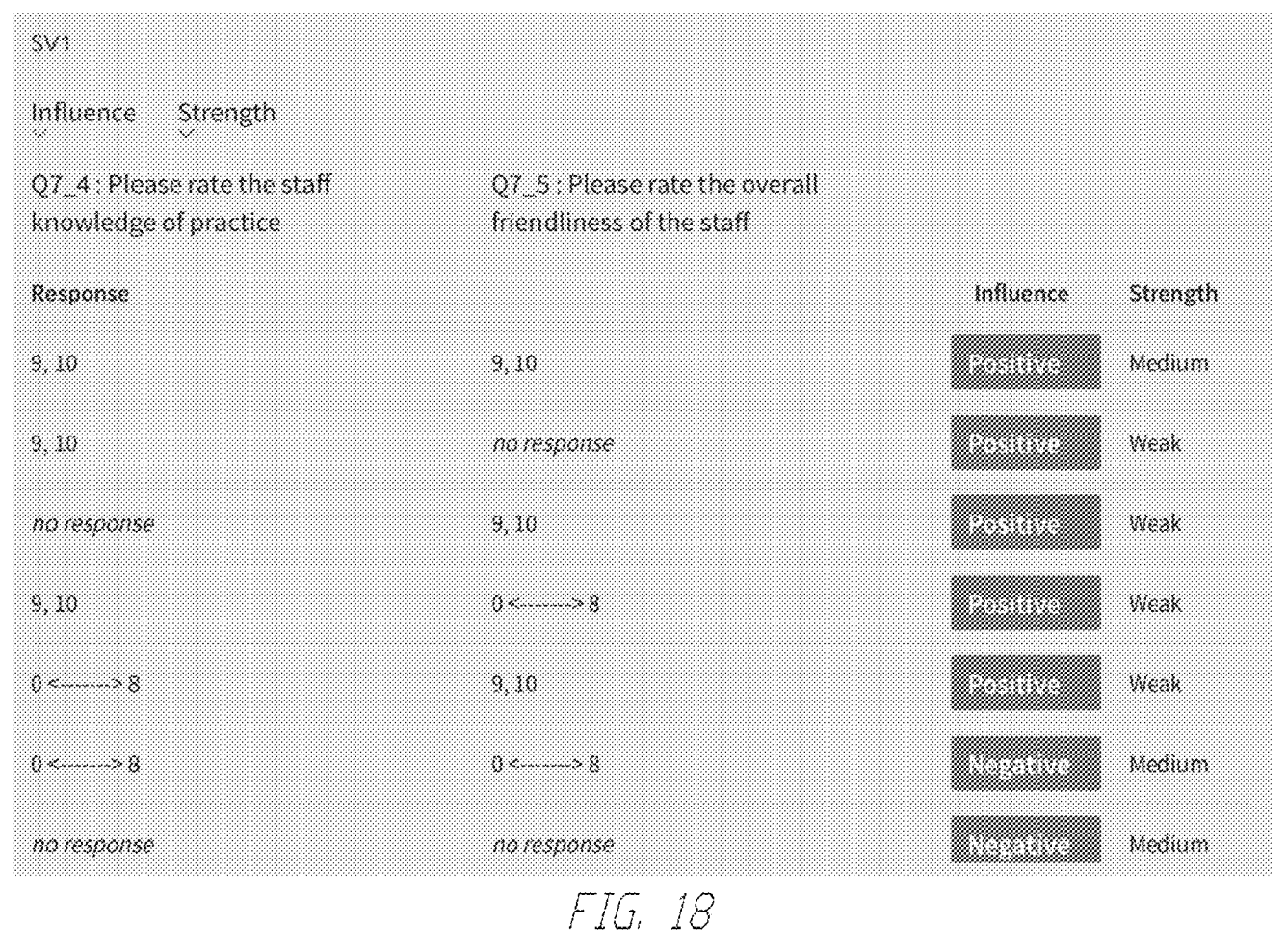

FIG. 18 is a screen shot depicting one embodiment of an example user interface that generates a graphical depiction of how data combinations correlate with a positive or negative influence on an objective.

Figure 19:
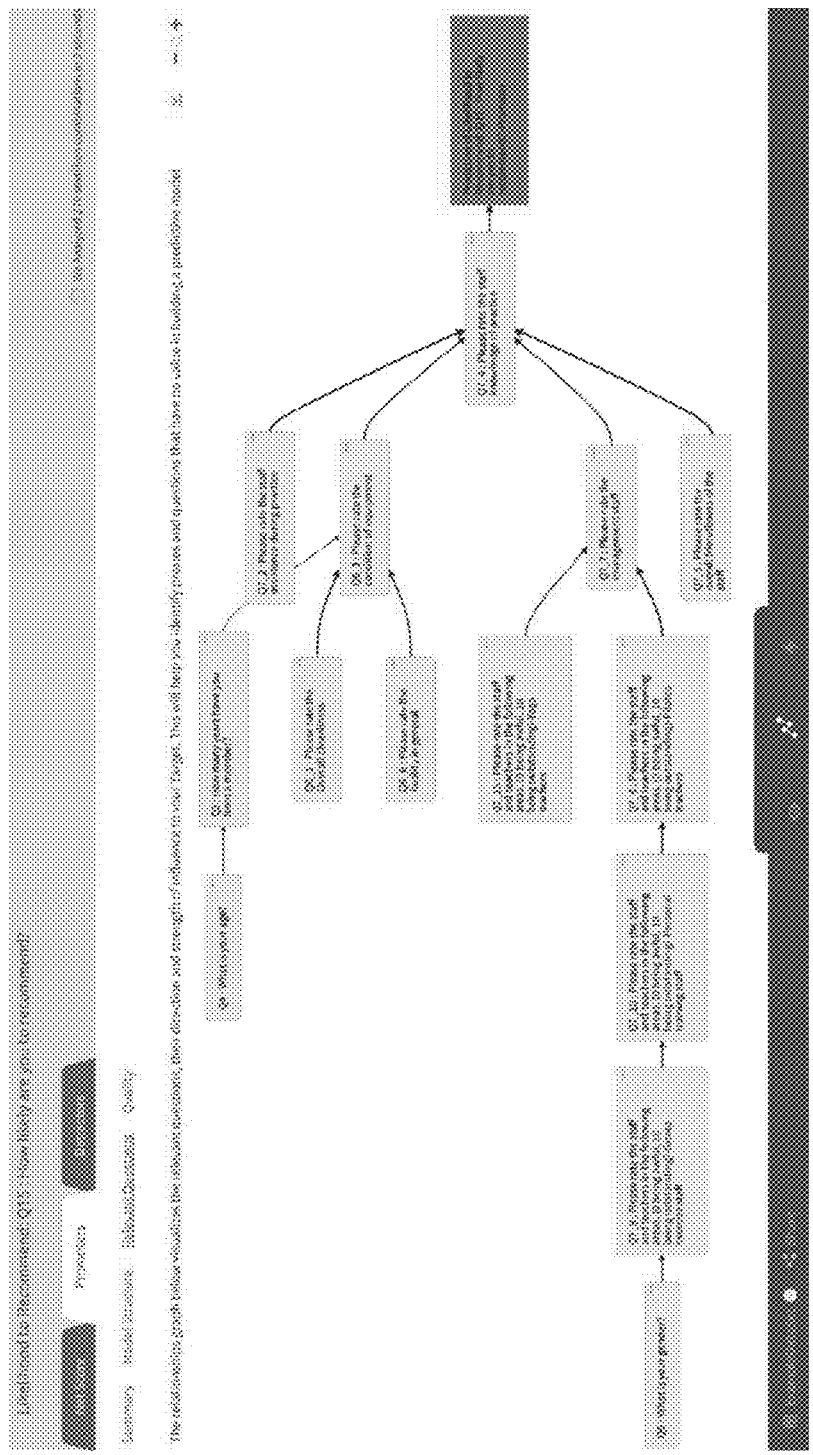

FIG. 19 is a screen shot depicting one embodiment of an example user interface that generates a graphical depiction of a relationship between data points and how they lead to an objective pertaining to the promoter analysis.

Figure 20:
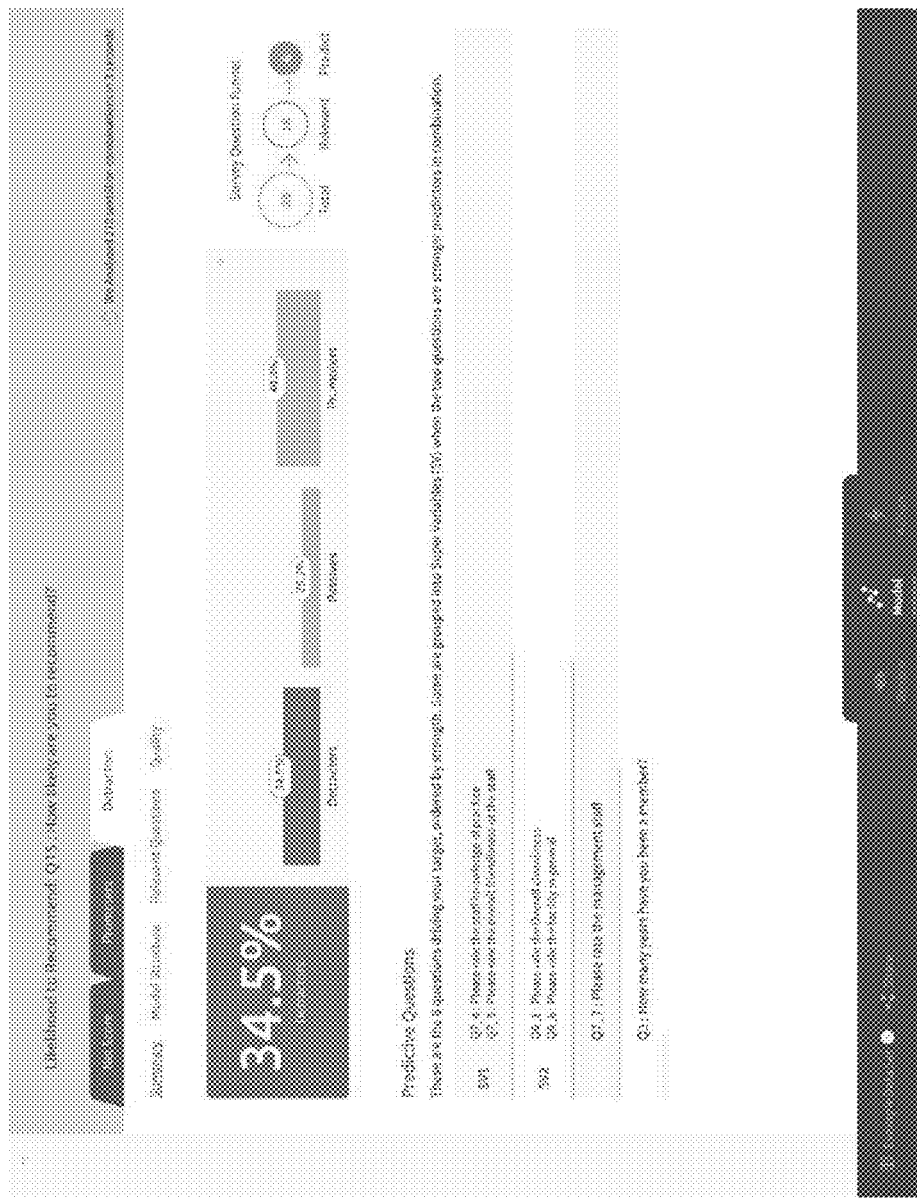

FIG. 20 is a screen shot depicting one embodiment of an example user interface that generates a graphical depiction of the results of an analysis with respect to detractors related to criteria set.

Figure 21:
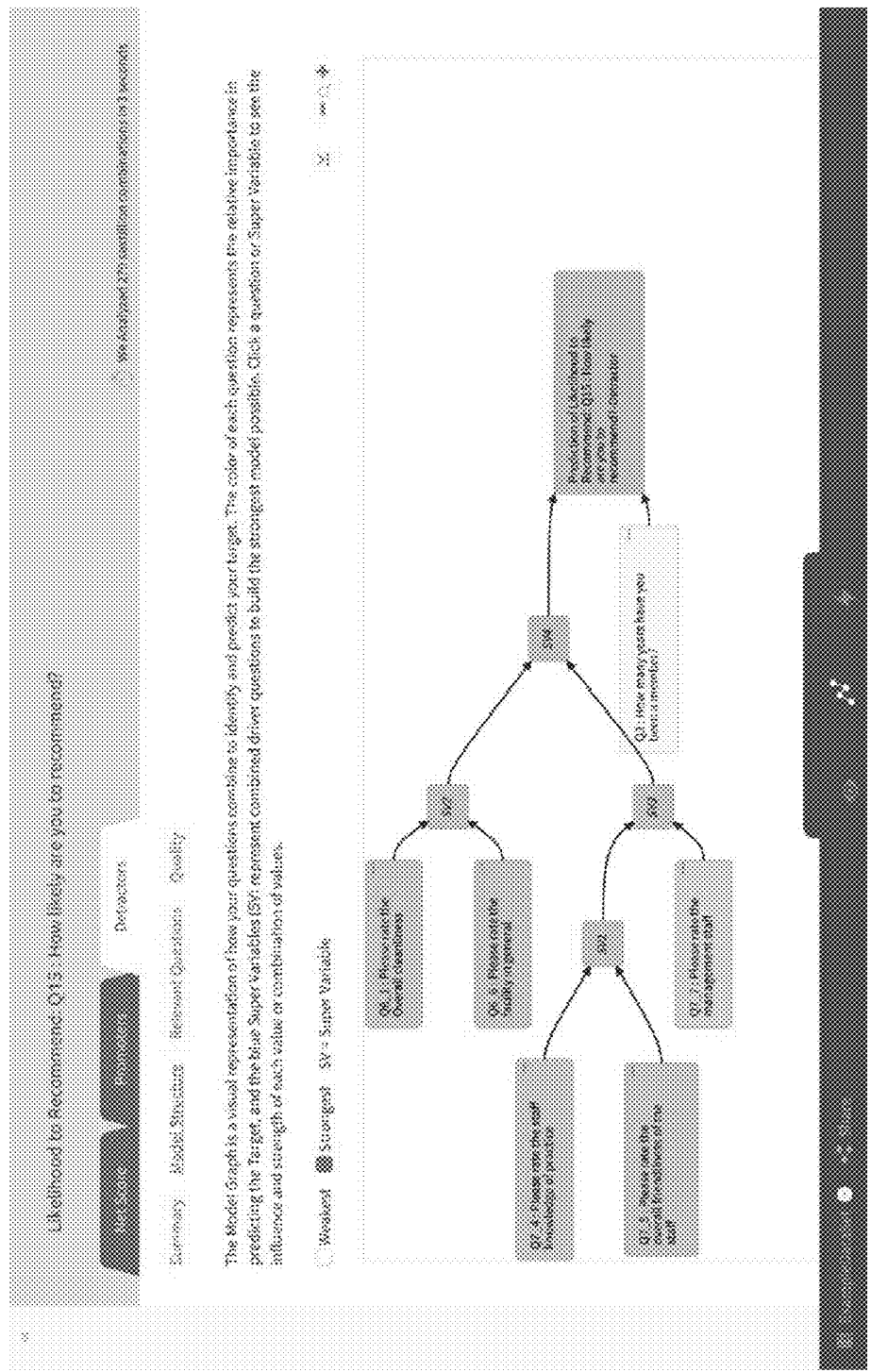

FIG. 21 is a screen shot depicting one embodiment of an example user interface that generates a graphical depiction of predictive details of an analysis pertaining to detractors, also showing where data holds more or less predictive value based on color and combination.

Figure 22:
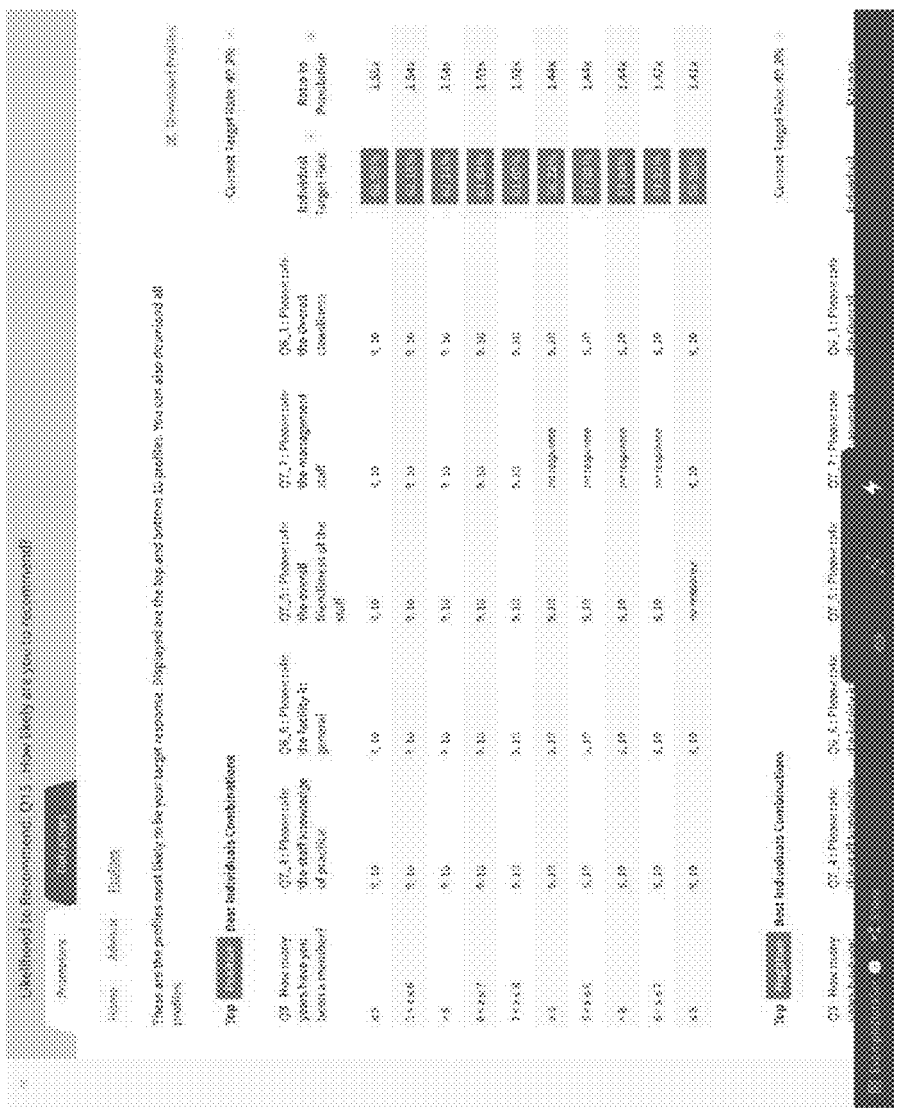

FIG. 22 is a screen shot depicting one embodiment of an example user interface that generates a graphical depiction of specific profiles of most positive and most negative characteristics of individuals in a data set pertaining to the detractor analysis.

Figure 23:
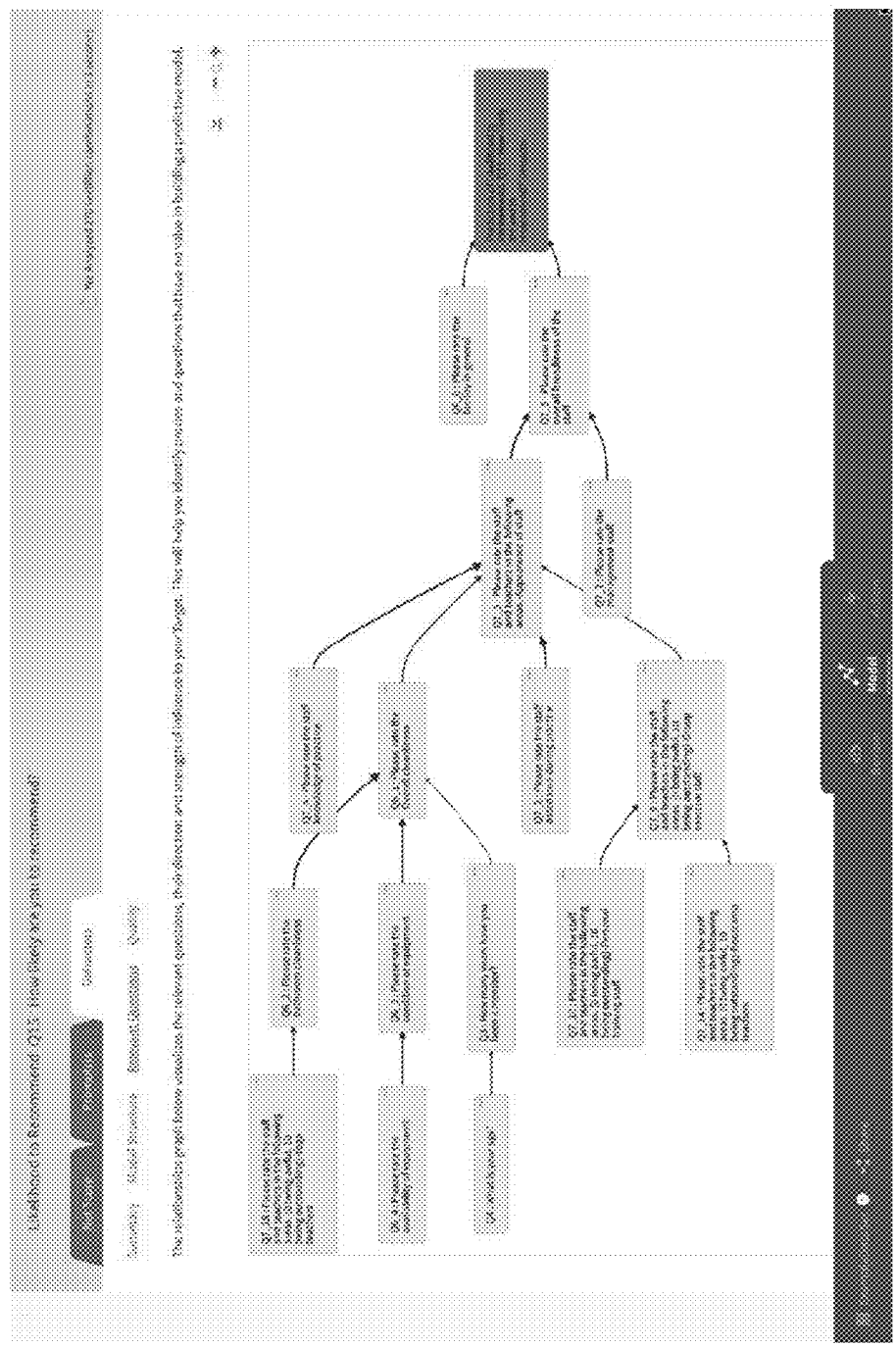

FIG. 23 is a screen shot depicting one embodiment of an example user interface, similar to FIG. 19, where the browser window shows a relationship between data and how they lead to an objective pertaining to the detractor analysis.

Figure 24:
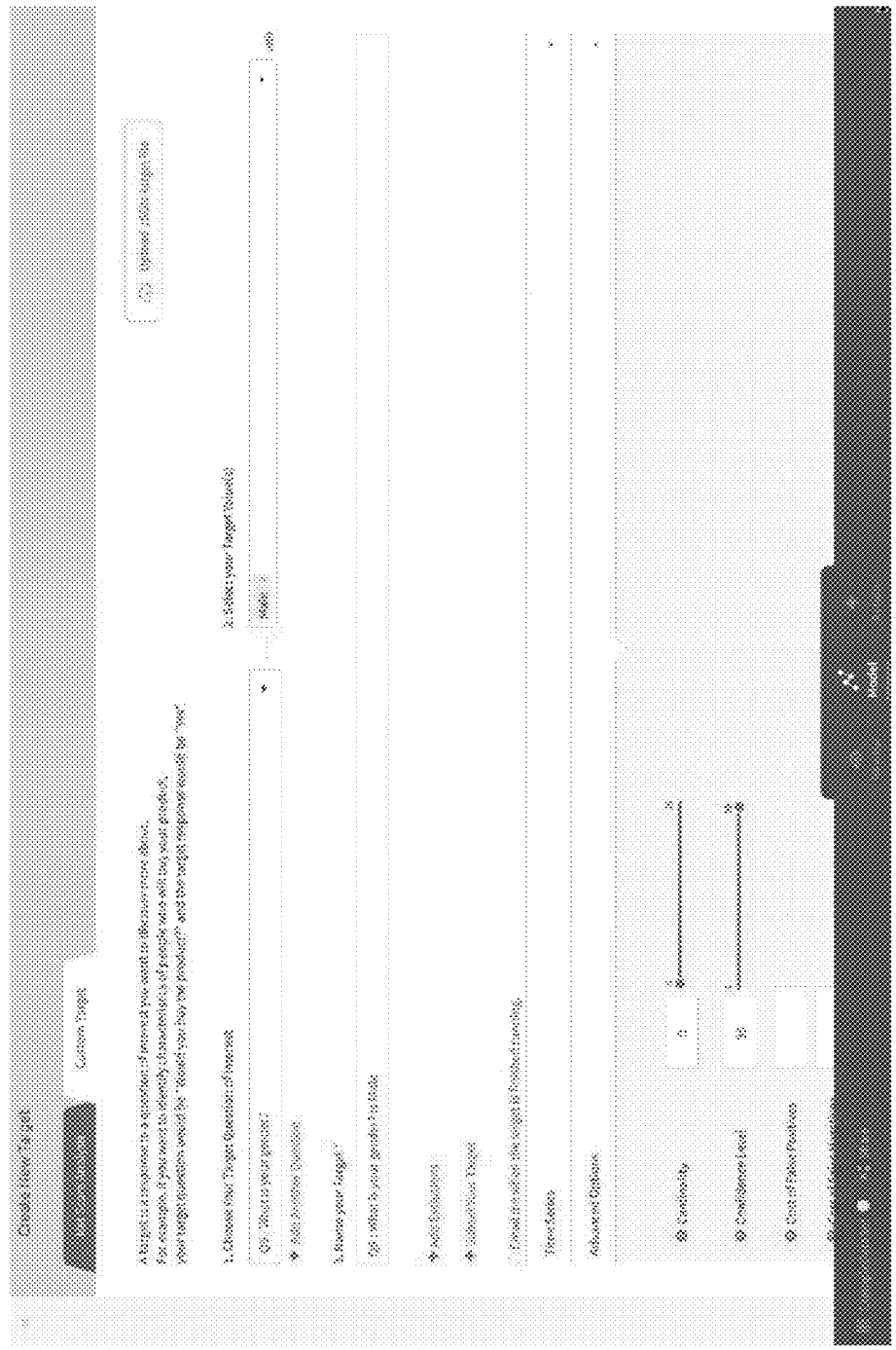

FIG. 24 is a screen shot depicting one embodiment of an example user interface, similar to FIG. 11, allowing for the input of any custom criteria to analyze data with additional customizations.

Figure 25:
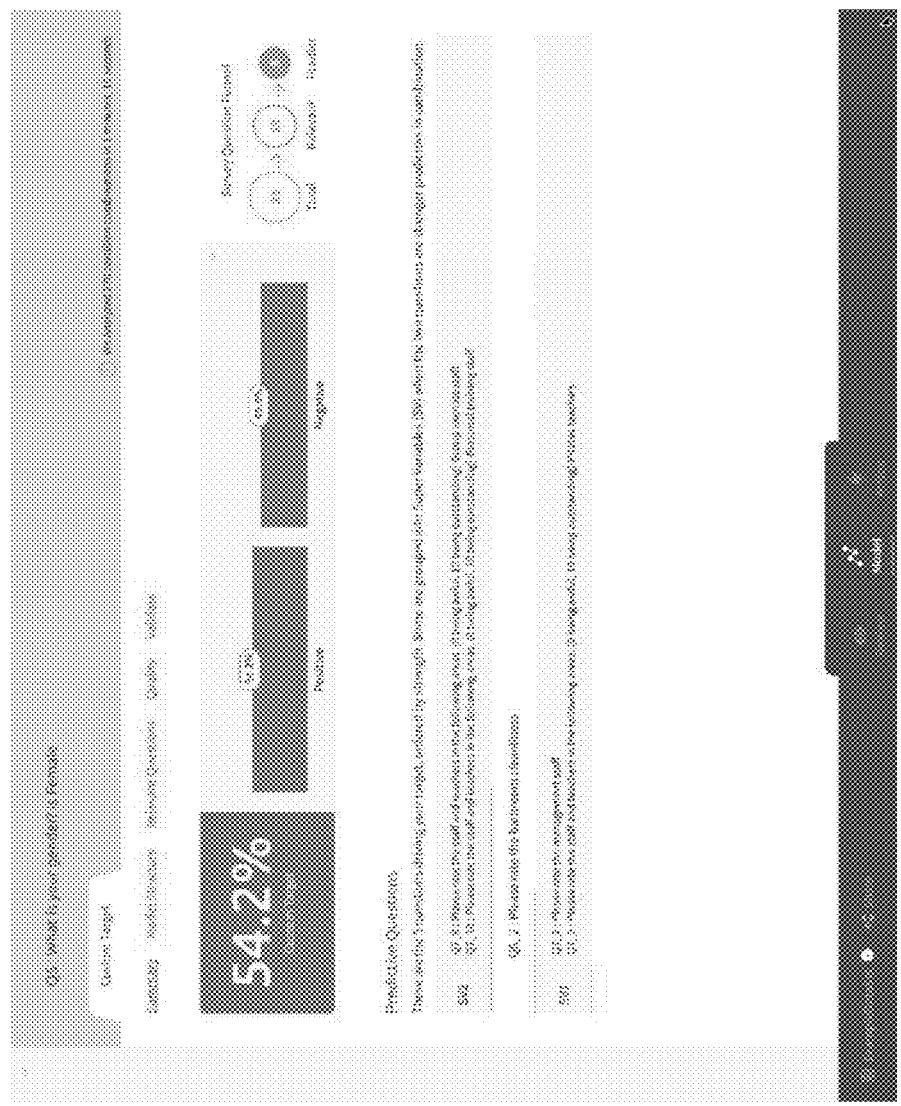

FIG. 25 is a screen shot depicting one embodiment of an example user interface that generates a graphical depiction of the summary of predictive results based on inputs.

Figure 26:
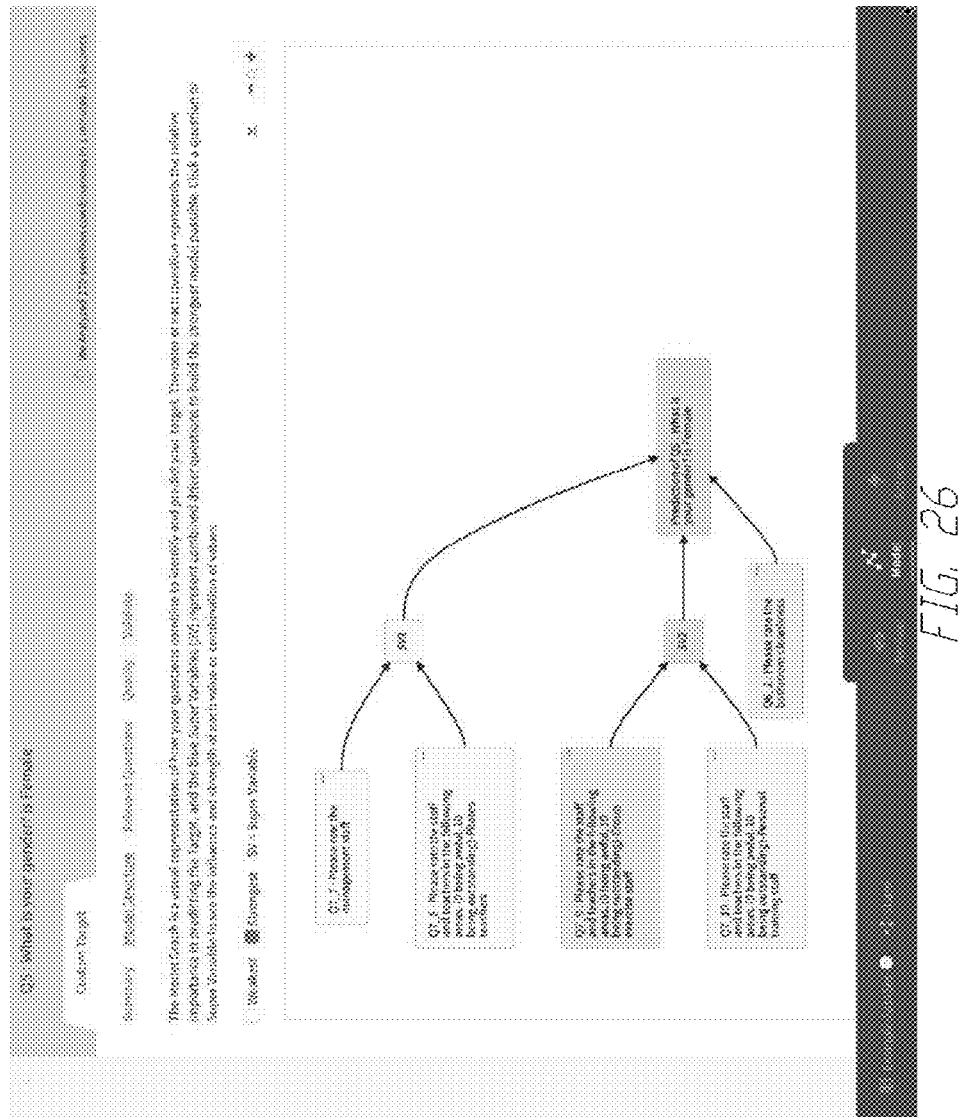

FIG. 26 is a screen shot depicting one embodiment of an example user interface, similar to FIG. 15, showing predictive details of an analysis, also showing where data holds more or less predictive value based on color and combination.

FIG. 27 is a screen shot depicting one embodiment of an example user interface, similar to FIG. 16, showing specific profiles of most positive and most negative characteristics of individuals in a data set pertaining to the promoter analysis.

Figure 28:
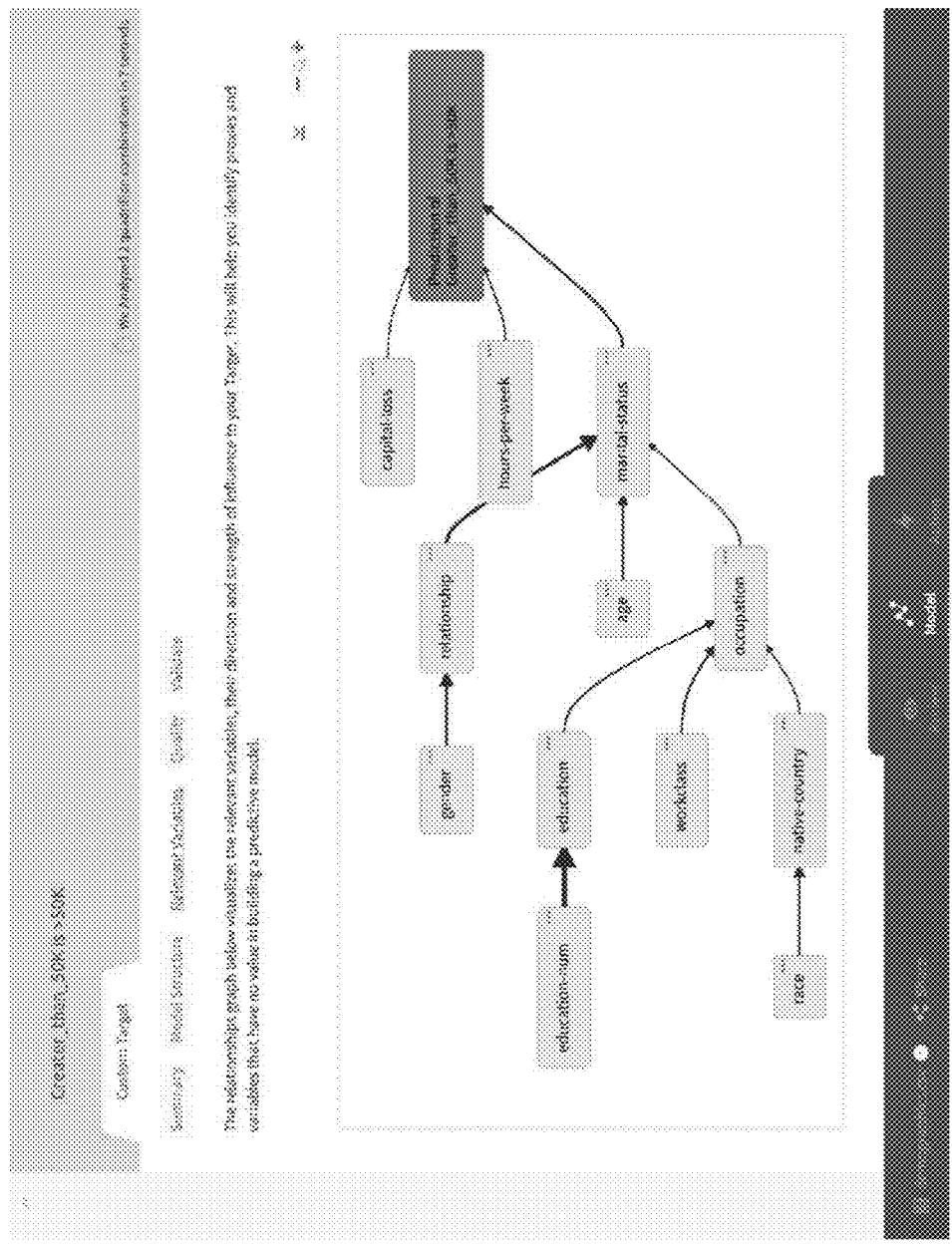

FIG. 28 is a screen shot depicting one embodiment of an example user interface, similar to FIG. 19, showing the relationship between data points and how they lead to an objective.

Figure 29:
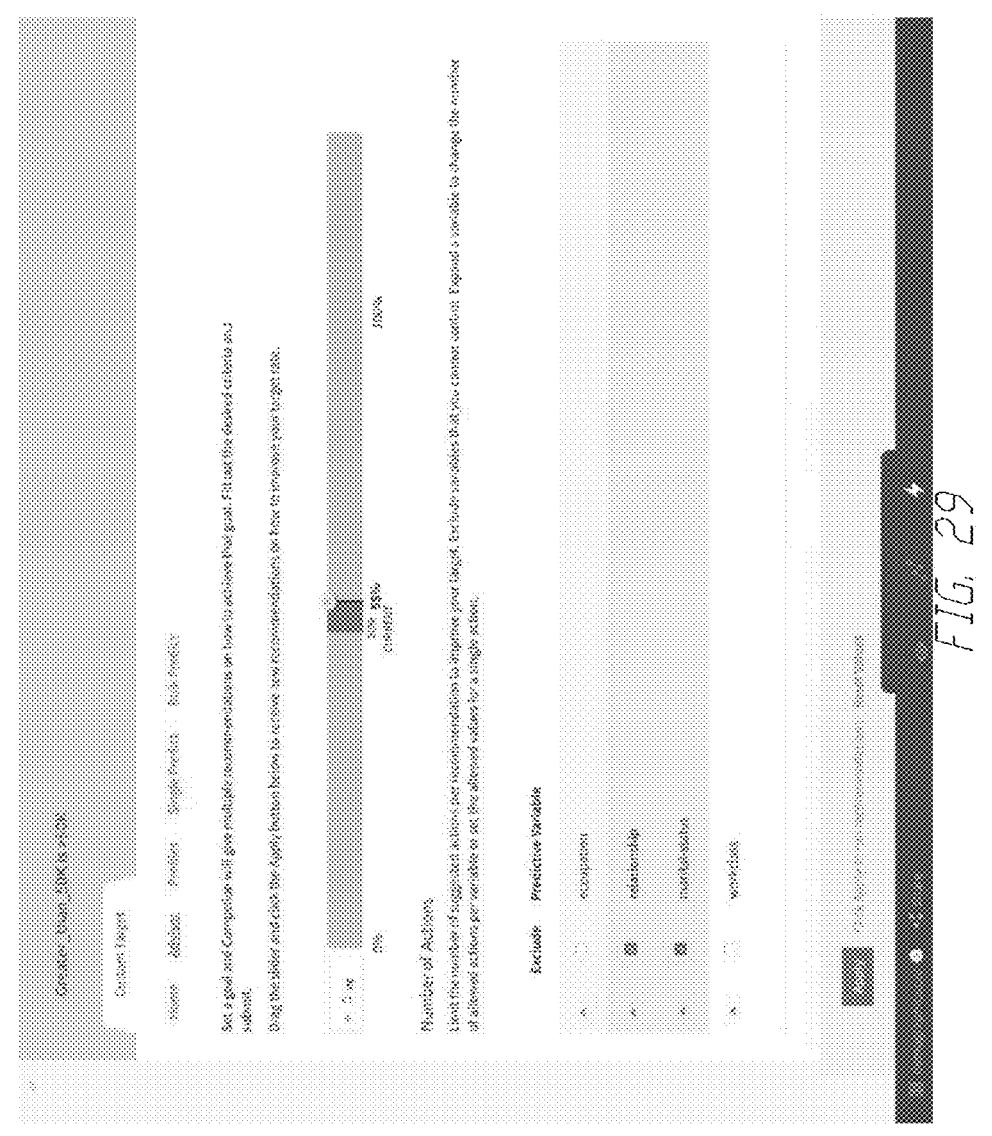

FIG. 29 is a screen shot depicting one embodiment of an example user interface, similar to FIG. 13A, allowing for the setting of a goal based on focused elements of data and recommendations based on a configuration.

Figure 30A:
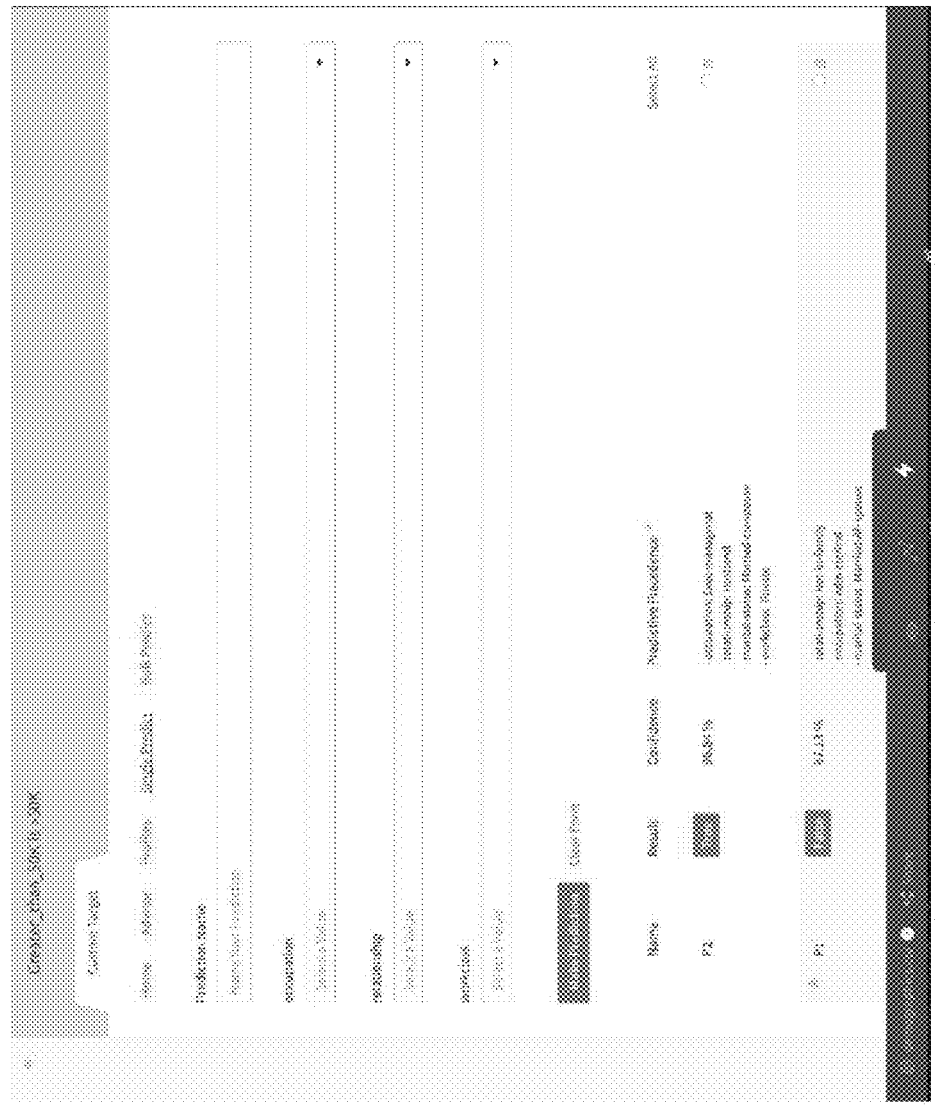

FIG. 30A is a screen shot depicting one embodiment of an example user interface, allowing for the entry of a single prediction based on customizable criteria and a previously generated model and rendering results of each prediction, including precedence of contributors to prediction.

Figure 30B:
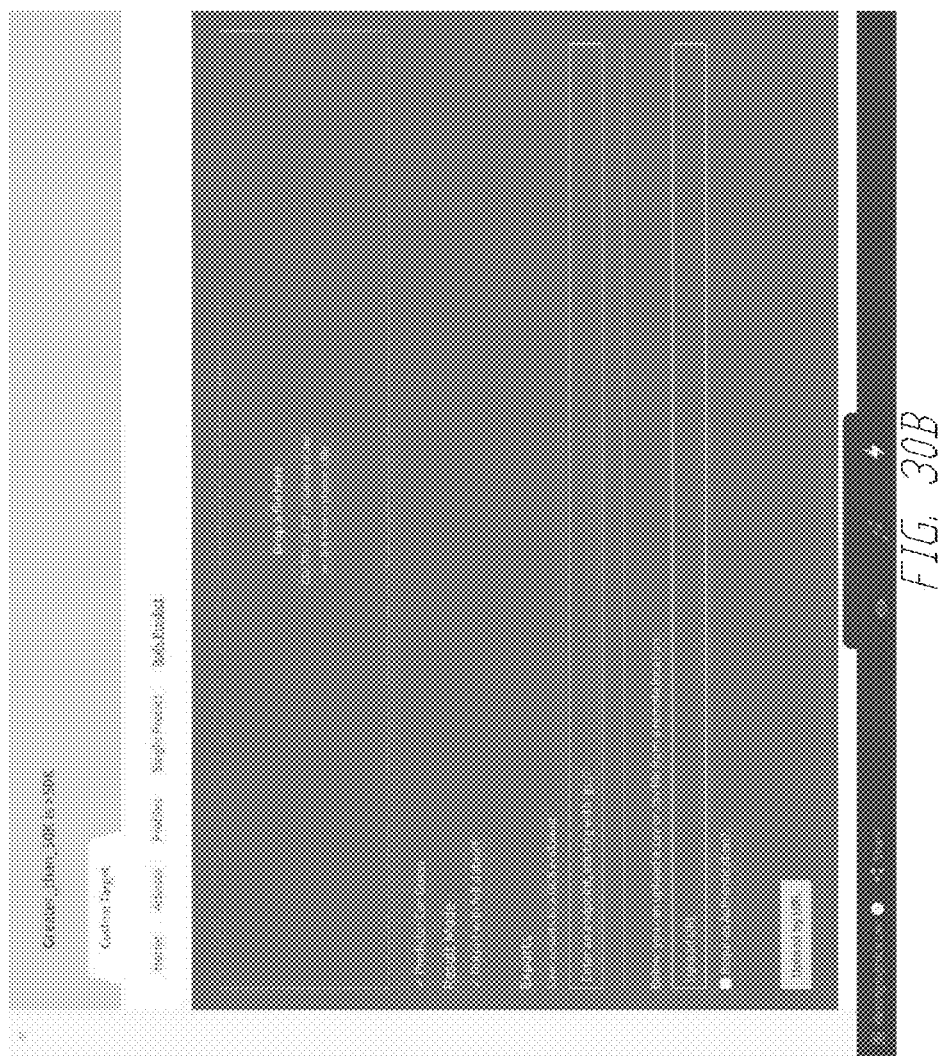

FIG. 30B is a screen shot depicting one embodiment of an example user interface, allowing for the entry of bulk data point prediction based on customizable criteria and a previously generated model.

Figure 30C:
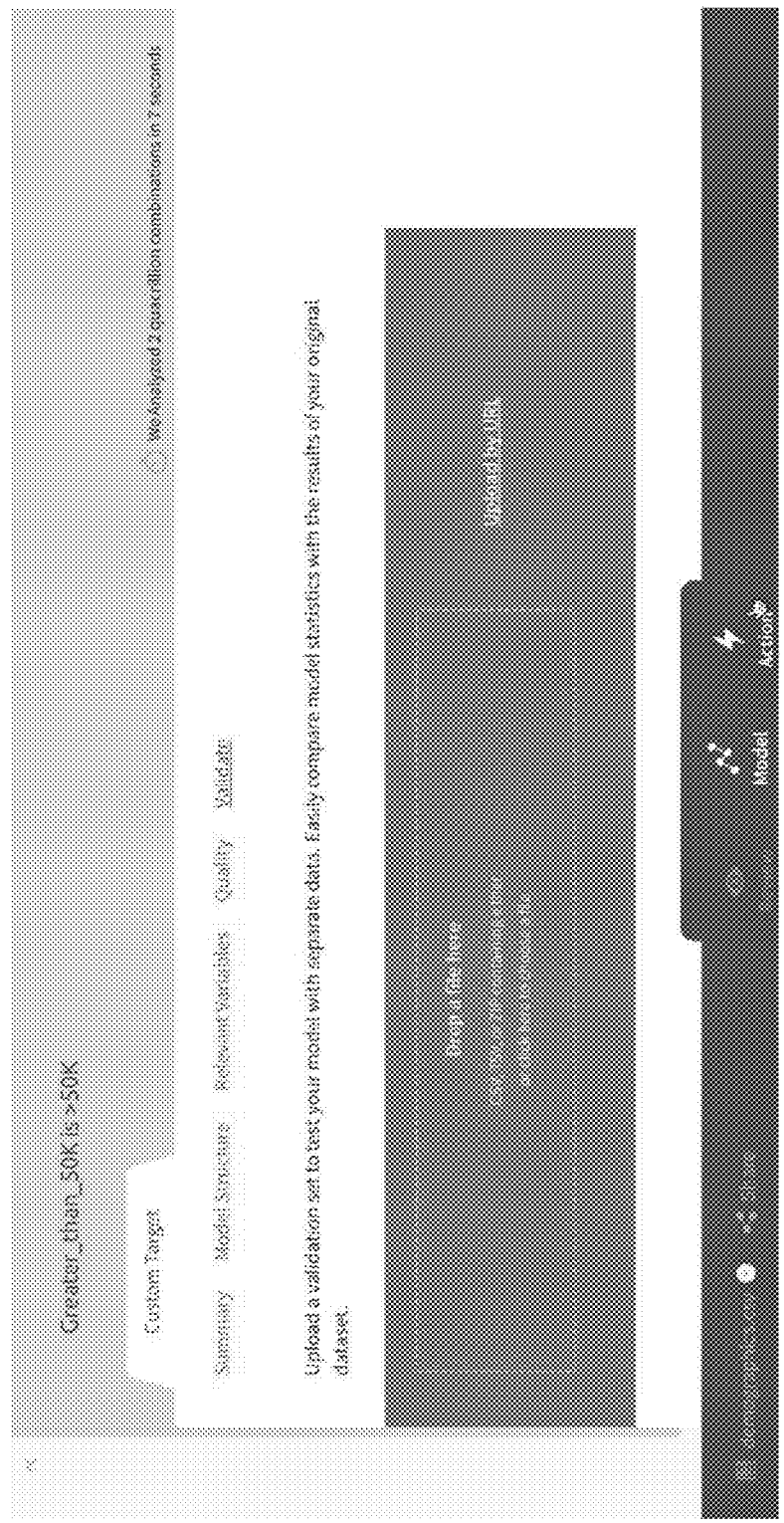

FIG. 30C is a screen shot depicting one embodiment of an example user interface, allowing for the entry of additional data to test or retrain a prediction model.

Figure 31:
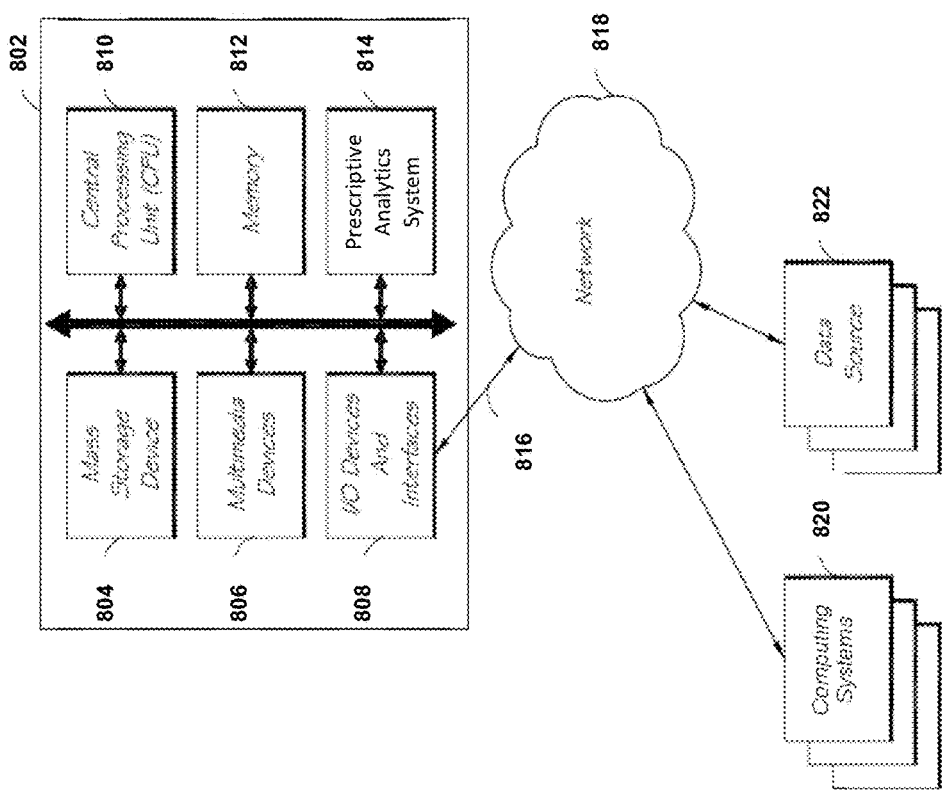

FIG. 31 is a block diagram showing one embodiment of a Prescriptive Analytics System in communication with a network and various systems, such as websites and/or online services.

DETAILED DESCRIPTION OF VARIOUS EMBODIMENTS

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. For purposes of this disclosure, certain aspects, advantages, and novel features of various embodiments are described herein.

I. OVERVIEW

The growth and collection of big data has greatly increased the opportunities for businesses to gain better insight as to their business operations. However, extracting accurate and meaningful insight from these large data sets can be challenging as many systems for analyzing big data of have one or more of the following shortcomings, (1) they are not comprehensive and lead to inaccurate prediction models, (2) they are inefficient and lead to high processing times, (3) they present the information and results in a complex and confusing manner, (4) they lack of customizability, (5) they are unable to adapt and change the prediction model in view of constantly changing data, and/or (6) they require data scientist/modeling expertise. An additional problem is they are unable to provide meaningful, computational analysis of unstructured data, even though the unstructured data often includes insightful opinions about key items of interest to the user, such as a topic, product, company, employee base, or event.

The systems and methods disclosed herein provide a prescriptive analytics platform and polarity analysis engine in which a user can identify a target objective and use the system to find out whether the user's objectives are being met, what factors are positively or negatively affecting the targeted objectives, as well as what changes the user can make to better meet the objectives. In some embodiments, the user can upload a large set of survey data that includes both structured and unstructured data and select a target objective tied to the survey data. A predictive analytics engine correlates the structured data with the selected objective to generate correlated structured data that indicates which factors within the structured data are the most predictive for the objective. It is recognized that a wide variety of predictive analytics engines may be used to generate the correlated structured data, including, for example, the predictive analytics engine provided by Compellon, Inc. Embodiments of the polarity analysis engine then analyze the free text data input and correlated structured data to derive polarity values for terms within the free text data in view of the selected objective. The polarity analysis engine is able to identify commonly used terms that negatively affect the selected objective and/or commonly used terms that positively affect the selected objective. A graphical display module may then analyze the results from the polarity analysis engine to generate a graphical representation of these terms along with indicators of their corresponding polarity for presentation to the user. The platform may also utilize the polarity analyses to generate recommended actions the user can take to maintain the positive sentiment and/or address the causes of the negative sentiment. Sentiment of a word or term includes indicators of the author's opinion expressed towards the related topic.

A benefit of some embodiments is that the prescriptive analytics platform and polarity analysis engine presents a polarity analysis of unstructured data in an easily digestible graphic representation, thus allowing the user, a human operator who is not an expert in data science or predictive modeling, to quickly understand key sentiment data drivers within large sets of unstructured data.

II. OVERVIEW OF A COMPUTING ENVIRONMENT

In some embodiments, a prescriptive analytics platform or system ("PAS") is included within a computing environment that allows a human operator (for example, a business owner) to interface with the prescriptive analytics platform via a user device or system. The prescriptive analytics system may communicate with a database that stores large data sets related to the operator (for example, survey data about the operator's business products or employees). The operator may upload the large data sets to the database, or the large data sets may be added to the database by third parties that collect data on behalf of the operator (for example, a survey company that collects survey data about the operator's business products or employees). The PAS can then receive or access the data sets from the database. The operator may utilize an application interface provided by the PAS to instruct the PAS to retrieve or upload one or more of the data sets stored in the database. The operator may also use the application interface to select a target objective. The PAS then determines statistically significant correlations between objective and structured data within the data set that are the key predictive drivers. The PAS may then present a report of these identified drivers in the application interface for review by the operator. The PAS may also correlate unstructured data within the data set with the correlated structured data and then conduct a polarity analysis of the unstructured data to identify commonly used terms in the unstructured data that correspond to a positive, neutral, or negative sentiment related to the key predictive drivers. Structured data includes organized data that follows a pre-defined data model (for example, labeled data), and unstructured data includes data that is not organized in a pre-defined manner (for example, unlabeled data) or does not have a pre-defined data model. Typically, unstructured data includes a lot of textual information, but the data may also include numbers, dates, and other types of information. Free text data, or free-form text data, is a type of unstructured data that includes mostly textual information. The PAS may present a graphical representation of the previously identified commonly used terms in the unstructured data that correspond to a positive, neutral, or negative sentiment related to the key predictive drivers that also depicts their corresponding polarity. The PAS may also use the polarity analysis to automatically generate recommended actions for achieving changes designated by the operator.

FIG. 1A is a block diagram depicting one embodiment of an architecture 100 for analyzing collections of structured and non-structured data by a Prescriptive Analytics System ("PAS"). The architecture 100 shown in FIGS. 1A and 1B include user device 104 accessed by an operator or user of the PAS 108, feedback data 102 or data sets from the user's customers or employees, a third party data collection system 106 with a database 107, a PAS 108, and an application interface (sometimes referred to as an interface) 110. The exemplary PAS 108 includes a predictive analytics engine 108a and a polarity analysis engine, 108b. In one embodiment, the interface 110 may be configured to present graphical representations of the PAS's evaluation, analysis, recommendations, and/or polarity analysis along with user interface features, such as, for example features that allow the user to submit data to the system, select target objectives, make customizations to the analysis, and so forth.

In some embodiments, the operator or user may be a solitary person, a group of people, a company, or combination thereof. Moreover, it is recognized that the PAS may be utilized by a variety of types users, which may include, for example, business owners, teachers, government workers, non-profit organizations, and so forth. As such, the PAS may be configured to review data from any subject matter and/or from a wide range of organizations including, but not limited to, gymnasiums, yoga studios, manufacturing plants, schools, restaurants, websites, or any physical or virtual organization.

III. EXEMPLARY HIGH-LEVEL DATA FLOW

FIG. 1B is one embodiment of an exemplary data flow using the computing environment of FIG. 1A.

In some embodiments, a user utilizes a third party data collection system 106, such as an online survey system, to solicit electronic response data, or feedback, from its customers 102, via an online survey (A). The user's customers provide feedback data 102, such as by answering the survey questions (B). The feedback data 102 may include both structured and unstructured data. Further, the feedback data 102 can be stored in a database 107 of the third party data collection system (B) which is in communication with the PAS 108 (for example, a survey results database of an online survey system) or provided directly to the user device 104. The user then instructs the PAS 108 to upload the feedback data 102 and selects a specific objective or goal for the PAS 108 to analyze with respect to the feedback data 102 (C). The PAS 108 imports the feedback data from the database 107 (and/or the user device 104) into the user's account for processing and analysis (D). The PAS 108 may conduct a single import, or may conduct periodic batch imports to obtain new updates to the user's feedback data 102.

The PAS 108 then utilizes the predictive analytics engine 108a to review the structured data within the feedback data 102 in view of the objective to identify statistically significant factors that are most predictive for the objective and generate a set of correlated structured data (E). The predictive analytics engine 108a may generate a graphical representation of the key predictive factors (or combinations of factors) for presentation to the user via the interface 110 (F). It is recognized that a variety of predictive analytics engines 108a may be used and that different predictive analytics engines 108a may be better suited for different types of data, different sized data sets, different time processing constraints, and/or different precision requirements. In some embodiments, the predictive analytics engine 108a is the Compellon, Inc. predictive analytics engine. While it is helpful to the user to know which factors are most predictive, correlated structured data does not provide information as to whether the information is predictive in a positive manner or a negative manner. Furthermore, correlated structured data does not provide the user with ways to make improvements to better meet the selected objective. In addition, the correlated structured data does not take into account the free text data within the feedback data 102, even though the free text data may include valuable information for the user.

To address these shortcomings of the correlated structured data, in some embodiments, the PAS 108 utilizes the polarity analysis engine 108b to analyze the free text data in view of the correlated structured data and conduct a polarity analysis to identify commonly used terms within the free text data that correspond to a positive, neutral, or negative sentiment related to the key predictive drivers within the correlated structured data (G). The polarity analysis engine 108b may generate a graphical representation of these terms and their polarity for presentation to the user via the interface 100 (H). For example, the polarity analysis engine 108b may generate a word cloud that is color coded to distinguish between positive and negative sentiment and where the relative font size of the words indicates the polarity strength of the word. The polarity analysis engine 108b may also use the polarity analysis to generate recommended actions for achieving the objective designated by the operator (I) and then generate a graphical representation of the recommendations for presentation to the user via the interface 110 (J).

As noted above, the feedback data 102 may be in the form of structured data or unstructured data. Structured data includes to organized data (for example, labeled data), and unstructured data includes data that is not organized in a pre-defined manner (for example, unlabeled data) or does not have a pre-defined data model. Typically, unstructured data includes a lot of textual information, but the data may also include numbers, dates, and other types of information. Free text data, or free-form text data, is a type of unstructured data that only includes textual information.

The exemplary interface 110 is accessible by the user device 104 and configured to receive input and instructions from the user and to transmit that information to the PAS 108. The interface 110 is further configured to allow the user to customize the analyses that will be performed by the PAS, such as, for example, selecting the feedback data 102, selecting the target objective, selecting a preferred increase or decrease in the score related to the selected objective, and so forth. The interface 110 is also configured to present the results generated by the PAS 108, such as, for example, the identified predictive factors, the word cloud, and the recommendations.

IV. EXAMPLE USE CASES

To illustrate one example use case, the PAS may be utilized by an owner of a work out gymnasium (referred to as a gym) who wants to improve his business by determining whether the gym's clients perceive the value of their monthly fees to be a worthwhile expense. The gym owner may use the PAS system to determine what features of the business are most significant to his goal based on insight from current clients that view the gym in a positive light and those that view the gym in a negative light. The owner could solicit data from its clients to try and capture feedback, such as, data about the clients (for example, age, health, education, years at the gym, marital status, or anything else relevant), data about how the clients like or dislike parts of the gym and by how much, The owner may utilize a survey that includes field-based questions (for example, age, gender, city of residence), ranking questions (for example, on a scale of 1 to 5 with 5 being the highest, how clean is the locker room area), as well as free text input field where clients can provide their own input (for example, provide any feedback on the locker rooms). The owner may also utilize data from the business (for example, data from key cards that logs of when clients come to the gym, how long they stay, what areas they spend the most or least amount of time in, how often they come, the amount they pay for their monthly fee, how long they have been a member, and so forth). The PAS may then conduct analytics on the solicited data to determine which factors drive in view of the owner's goal of having clients feel that they are not overpaying for monthly fees. The PAS may also analyze free text feedback in view of the determined factors to identify terms that are used a statistically significant number of times and indicate a significant positive or negative sentiment. The PAS may then provide a graphical review of the polarity analysis of the terms so that the owner can see what words reflected the most positive sentiment (for example, remodeled, shower, or equipment) or negative sentiment (for example, towels, cheap, expense, or classes). The PAS may utilize the polarity analysis to generate recommended changes the owner can make (for example, upgrade to better quality towels, reduce the price of the "additional fee" classes) in order to achieve the target goal of having the current gym clients perceive that they are not overpaying on monthly fees.

As another example use case, the PAS may be utilized by a human resources (HR) manager for a subscription-based social media website that is experiencing a lot of employee attrition. The company could solicit data from its employees to determine whether the employees expect to be at the company in 6 months. The feedback may include field-based questions (for example, department, years at the company), ranking questions (for example, on a scale of 1 to 5 with 5 being the highest, how do you rate your manager, how do you rate the free snacks), as well as free text input field where customers can provide their input (for example, provide any feedback on your work area set up). The PAS may then conduct analytics on the solicited data to determine which factors drive in view of the HR manager's goal of increasing employee retention. The PAS may also analyze free text feedback in view of the determined factors to identify terms that are used a statistically significant number of times and indicate a significant positive or negative sentiment. The PAS may then provide a graphical review of the polarity analysis of the terms so that the owner can see what words reflected the most positive sentiment (for example, new, desks, team, approach) or negative sentiment (for example, slow, computers, unrealistic, deadlines). The PAS may utilize the polarity analysis to generate recommended changes the HR manager can make (for example, institute additional training for managers to help them better set deadlines for project milestones, upgrading to faster computers) in order to achieve the target goal of retaining the current employees. The HR manager can then utilize the PAS to extract the key data points that are affecting her objective without having to be an expert in data science or predictive modeling.

V. COMPUTING SYSTEM COMPONENTS

A more detailed description of the embodiments of FIG. 1A is now discussed. As noted above, the system architecture 100 shown in FIG. 1A includes a user device 104, feedback data 102, a third party data collection system 106 with a database 107, a PAS 108, and an interface 110. In one embodiment, the computing system component such as the PAS 108, the user devices 104, and/or the third party data collection system 106 electronically communicate via one or more networks, which may include one or more of a local area network, a wide area network, the Internet, or a cloud-computing network, implemented via a wired, wireless, or combination of wired and wireless communication links.

A. User Device

In some embodiments, a user may interface with the PAS 108 using a user device 104, which may include, for example, a computer, a laptop, a smart phone, a tablet, a smart watch, a car console, or any other computing device. The user may provide feedback data 102 to the PAS or may instruct the PAS to upload the feedback data 102 from the third party data collection system 106. The user may also provide instructions to the PAS 108 related to the analyses, such as, for example, data formats, selection of objective(s), features to exclude from analysis, and so forth. Although FIG. 1A includes one user device 104, it is recognized as a plurality of user devices (of the same or different types), may be used to interface with the PAS 108. For example, there may be three different company representatives that each utilize their own set of user devices to interface with the PAS 108. In addition, there may be a multitude of other clients, each with their own set of representatives, that utilize user devices to communicate with the PAS 108.

B. Feedback Data

In some embodiments, the feedback data 102 includes data solicited from a user's customers, employees, other groups of people of interest to the user, that provides insight as to a particular topic of interest to the user, such as, for example, the user's products, services, company, employees, website, and so forth. The feedback data 102 may include data collected by a third party service system, such as a survey system that collects feedback data 102 via online surveys, and may also, or instead, include other data that the user collects through other channels (for example, paper surveys, employee tracking, product reports, application information, complaint forms, phone or in-person interviews, and so forth). The feedback data 102 may be stored in a variety of formats and may include both structured and unstructured data.

The feedback data 102 may be provided to the user device 104, the third party data collection system 106, and/or the PAS 108 from the people of interest to the user, where such people submit the feedback data through a device, or a customer, through its device (for example, a computer, a laptop, a smart phone, a tablet, a smart watch, a car console, or any other computing device).

C. Interface

In some embodiments, the PAS 108 provides results and/or various information to the user's device 104 through an interface system 110. This interface system 110 also allows the user through the user device 104 to provide data and instructions to the PAS 108, such as, for example, select datasets for review or uploading, select objectives, format the data, customize the application, and/or change settings of the PAS 108. Thus, the interface 110 may display data, reports, graphical charts, word clouds, user interface tools, recommendations, and so forth.

In some embodiments, the interface 110 is provided as a browser-based interface that is accessed by the user device 104 via a standard Internet browser. The PAS 108 includes an interface module configured to generate instructions for displaying an interface within the Internet browser of the user device 104. In other embodiments, the interface 110 is provided as a downloadable application that can be run in part or in full on the user device 104.

D. Third Party Data Collection System and Database

In some embodiments, the third party data collection system 106 is configured to interface with a set of devices to collect feedback data 102. For example, the third party data collection system 106 may be a survey platform that sends out to a set of recipients, emails or text messages that include a link to an online survey. The recipients may then utilize their devices to select the link and access an online survey of the third party data collection system 106 and to provide responses to the survey questions. The responses of the recipients may be stored in the database 107. The database 107 may be implemented as one or more databases of the third party data collection system 106 and may be stored locally in the third party data collection system 106 or in a remote location. The database 107 may be configured to automatically store data from the recipients. In some embodiments, the third party data collection system 106 communicates directly with the PAS 108 to allow the PAS 108 to upload data from the database 107. However, in other embodiments, the third party data collection system 106 may allow the user device 104 access to the feedback data 102 such that the user device 104 provides the feedback data 102 to the PAS 108.

In some embodiments, the database 107 includes one or more internal and/or external databases, data sources, physical data stores, or non-transitory memory devices and may be implemented using one or more of a relational database, such as HBase, Sybase, Oracle, CodeBase, and Microsoft® SQL Server, as well as other types of databases such as, for example, a flat file database, an entity-relationship database, an object-oriented database, or a record-based database.

E. Prescriptive Analytics System

In some embodiments, the PAS 108 accesses feedback data 102 related to a user and stores the data in one or more databases in or in communication with the PAS 108. As noted above, the data may come from the user device 104, the third party data collection system 106, or another system.

In some embodiments, the PAS 108 includes a predictive analytics engine 108a configured to correlate structured data within the feedback data 102 with the objectives selected by the user. The predictive analytics engine 108a may then determine which factors are most statistically predictive of the target objective and generate a predictive model which can be used to predict the likelihood of meeting the target objective based on a set of new data. The predictive analytics engine 108a may also include instructions for generating a user interface for presenting the predictive factors to the user for review.

In some embodiments, the PAS 108 also includes a polarity analysis engine 108b configured to analyze the correlated structured data in view of unstructured data within the feedback data 102 to identify words within the unstructured data that are commonly used and reflect a strong positive or strong negative sentiment. The polarity analysis engine 108b may also include instructions for generating a user interface for presenting a graphical representation of the identified words, such as in a word cloud. The polarity analysis engine 108b may also use the polarity analysis to generate recommended actions for the user to take to address the concern within some of the negative sentiment and include instructions for generating a user interface for presenting the recommendations in the interface 110.

VI. PRESCRIPTIVE ANALYTICS SYSTEM ("PAS")

FIG. 2 is a block diagram showing one embodiment of a PAS 210 and its interaction with a set of input data 201 and generation of output 230. The PAS 210 is one embodiment of the PAS 108 of FIGS. 1A and 1B.

1. Input

The exemplary PAS 210 includes a data input module 211 within a communications module 212 configured to electronically communicate with one or more third party systems to receive input data 201, inputs including, for example, user-selected objective(s) 202, user collected data 204, and feedback data 205.

The objectives 202 may include electronic indications of the user's goals or targets the user would like to achieve. Some non-limiting examples include retaining existing customers, increasing the likelihood that customers may recommend the user's product to others, increasing the likelihood that customers may purchase another product from the user, increasing the likelihood that customers may spend a certain dollar amount in the next purchase, reducing the likelihood that an employee may leave the company, increasing overall employee satisfaction with their job. The input may also include an indication of an amount by which the user wants to change a score that indicates an amount or level at which the user is currently meeting the requested objective. For example, only 33% of the responders may indicate that they were satisfied with the dessert menu options offered by a restaurant. The restaurant may select an objective of increasing the percentage by 20% such that at least 53% of its customers are satisfied with the dessert menu options offered by the restaurant.

The user collected data 204 may include information that the user collects and uploads direct to the PAS 210. For example, separate from the third party data collection service, the user may collect data from paper surveys, customer tracking, application information, complaint forms, phone or in-person interviews, and so forth.

The feedback data 205 may include response data generated by recipients of the user's survey, such as the user's customers, potential customers, or employees. This data may include structured data based on a finite set of answers 206 (for example, ranking a provided from 1 to 10 with 1 being the least accurate and 10 being the most accurate, True or False questions, providing a score from A to F, and so forth). Feedback data 205 may also include unstructured data 207, part of which may be where recipients provide feedback in free text form 208.

2. Output

The exemplary PAS 210 includes a data output module 213 within the communications module 212 configured to generate data to be provided to one or more third party systems. The data output module 213 may be configured to generate electronic reports, user interfaces, webpages, instructions for generating webpages, data collections, and so forth that reflect one or more of the analyses performed by the PAS 210. Moreover, the data output module 213 may be configured to instruct a user interface module to present the data to the user or to generate data packets that include instructions for a remote application to present the data to the users. The data packets may be encrypted and/or configured for delivery over a network for display on a remote device. The exemplary outputs 230 include key predictive factor(s) 238, polarity 236, word clouds 232, and/or recommendation(s) 234.

The key predictive factors 238 may include a listing or depiction of the factors the PAS (or the predictive analytics engine) has identified as having a strong influence on the target objective. The key predictive factors 238 may include single factors such as age, household income, number of nights per month spent in a hotel, and so forth. The key predictive factors 238 may also include combined factors, such as the comfort of the hotel room combined with the quality service at check in.

The recommendations 234 may include changes generated and selected by the PAS 210 based on the user's objective(s) 202 or focused objective delta, polarity analysis, and the correlated structured data generated by the prediction model. The focused objective delta may include an amount, such as a percentage, that the initial target objective is changed. The focused objective delta may be selected by the user and/or recommended by the PAS 210. The recommendations 234 may be different for different objectives 202 even if the applied prediction model is based on the same data (may include part or all of user provided data 204 and/or part or all of feedback data 205). The focused objective delta may relate to an overall objective (for example, increase the likelihood that a gym client will recommend the gym), or may relate to changes that can be made to influence responders that provide negative feedback (for example, address the smelly towels highlighted by the detractors) as well as responders that provide positive feedback (for example, increase the number of free classes for long standing members).

The polarity 236 may include an indicator of the sentiment combined with the predictive importance of specific words, phrases, or specific factors in view of the selected objective. The key predictive factors 238 may be represented as a list or graphic showing which factors are the most to least predictive based on the objective(s) 202. The factors 238 may include features, services, products, or aspects of a particular user's business or topic, or the like.

The word cloud 232 may include a graphical word structure that identifies commonly used words that drive positive or negative sentiment which either supports or hinders the objectives. To achieve the objective(s) 202, the user can increase/improve the identified supporting factors by a certain percentage or decrease the identified hindering factors by a certain percentage, according to the prediction model. As one example, the PAS 210 may generate a custom word cloud image based on a specific recommendation 234. The custom image may contain words that have been provided to the system by the user or its customers. Additionally, the words may be represented by some, all, or any combination of the following, but also not limited by, frequency, connotation, magnitude, sentiment, relevance to the recommendation, order received, or date received. One example for showing sentiment would be for the PAS to use different colors for positively and negatively correlated terms, where positive terms are one color and negative terms another color. One example for showing relevance to the recommendation could be for the most relevant terms to appear in the center of the image and less relevant terms to appear on the edges. Another example for showing relevance to the recommendation could be to show larger words for the more relevant terms and smaller words for the less relevant terms, or a combination of size and location. The word cloud 232 may be representative of one recommendation 234, a group of recommendations, or an overall assessment of the objective 202.

3. PAS Components

The exemplary PAS 210 includes a communications module 212, a data module 218, a predictive analytics engine 228, and a polarity analysis engine 214.

a. Communications Module

The exemplary communications module 212 is configured to facilitate communication between the PAS 210 and other systems or devices. The communications module 212 may include the data input module 211 and/or the data output module 213. The data input module 211 is configured to receive and process various input data 201 into the PAS 210. The data output module 213 is configured to process and format various data and results of the various analyses for access by other systems, such as the interface or third party systems.

b. Data Module

The exemplary data module 218 is configured to control and manage the storage of data within the PAS 210 as well as responding to requests for accessing or updating the data stored within the PAS 210.

c. Predictive Analytics Engine

The exemplary predictive analytics engine 228 is configured to analyze structured data in view of a selected objective to identify factors or groups of factors that have the most predictive effect on the objective and generate a corresponding predictive model. The predictive analytics engine 228 may also be configured to regenerate or update the predictive model based on new or updated feedback data. The predictive analytics engine 228 is one embodiment of the predictive analytics engine 108a.

d. Polarity Analysis Engine

The exemplary polarity analysis engine 214 is configured to analyze unstructured data in view of the correlated structure data and the selected objective to determine polarity of key terms within the unstructured data. The polarity analysis engine 214 may include, but is not limited to, a free text analyzer module 215, a scoring module 216, a data module 218, a polarity module 220, a free text filter module 222, a data feedback module 224, evaluation module 226, and a prescriptive analytics module 228. The polarity analysis engine 214 is one embodiment of the polarity analysis engine 108b.

The exemplary free text analyzer module 215 is configured to analyze data that is categorized as free text data and may, for example, group words or terms together based on their lemma, which results in grouping words together that are different but have the same base form. For example, the free text analyzer module 215 may group the words "talk," "talks," and "talked" together as a single base word category and assign it the lemma "talk".

The exemplary free text filter module 222 is configured to apply an electronic filter to the categorized free text data to identify specific words of interest, such as actionable words like nouns and adjectives, in view of the user objective(s). The free text filter module 222 is also configured to correlate the filtered and categorized text data with the structured data.

The exemplary scoring module 216 is configured to analyze the user's objectives against the structured data within the feedback data to generate a score indicator of how well (if at all) the user is meeting the objective and/or a set of correlated structured data. The scoring module 216 may also be configured to analyze the correlated structure data in conjunction with the filtered, lemmas to create an aggregate of lemmas scored by the objective.

The exemplary data feedback module 224 is configured to analyze the distribution of the filtered lemmas against the distribution of the objective(s) in the original, correlated structured data to provide the context of polarity. The data feedback module 224 is configured to analyze the resulting feedback based on how often or not the lemma appears, for example based on rarity and/or aggregate frequency.

The exemplary evaluation module 226 is configured to create final polarities based on the newly distributed lemmas with independent treatment of positive and negative terms. In one embodiment, the evaluation module 226 assigns a polarity strength value between −1 to +1 to the lemmas where −1 represents negative sentiment and 1 represents positive sentiment.

The exemplary polarity module 220 is configured to store the assigned polarities of each, but not necessarily every, lemma. In some embodiments, the polarity module 200 is configured to creating graphical representations that depict the predictive terms, their corresponding frequency, and polarity in an image or display, such as, for example, a word cloud.

It is recognized that there are other embodiments of the polarity analysis engine which may exclude features of the exemplary polarity analysis engine 214 and/or may include additional features. As such, some of the processes and/or modules discussed herein may be combined, separated into sub-parts, and/or rearranged to run in a different order and/or in parallel. In addition, in some embodiments, different blocks may execute on various components of the PAS 210.

VII. PRESCRIPTIVE ANALYTICS SYSTEM PROCESSES

FIGS. 3, 4, 5, 6, and 7 are flowcharts illustrating various embodiments of Prescriptive Analytics System processes that execute within the computing environment. In some embodiments, the processes are performed by the PAS 210, as show in FIG. 2, and/or by one of its components. However, it is recognized that other components of the PAS or other components (not shown) may perform one or more of the processes. For ease of explanation, the following describes the services as performed by the PAS 210. The example scenarios are intended to illustrate, but not to limit, various aspects of the computing environment. In some embodiments, the processes can vary from the exemplary flowcharts, with some blocks omitted and other added.

A. Polarity Analysis

FIG. 3 is one embodiment of a block diagram which illustrates a process for conducting a polarity analysis which may utilize various components of the PAS 210 including, for example, communications module, predictive analytics engine, and polarity analysis engine, according to one embodiment.

Beginning at block 304, the user sends a survey to a target group and collects a set of results from the responders and utilizes the PAS communications module 212, as shown in FIG. 2, to submit the set of results to the PAS and/or instruct the PAS to upload the results. The results may include both structured and unstructured data, such as free text data. In block 306, the user utilizes the communications module to submit selected or created objectives to the PAS as well as other instructions, such as data to exclude or include in the analysis, data formatting instructions, and so forth.

In block 308, the PAS receives the results data and objective(s) from the user through the communications module. In block 310, the Predictive Analytics Engine of the PAS processes the structured data in view of the objective(s) to identify key predictive factors, generate a predictive model, and generate correlated structure data.

In block 320, the Polarity Analysis Engine of the PAS 210 accesses the unstructured data, or free text data, of the results, processes the data using natural language processing, which may include, tokenizing, sentence splitting, part of speech analysis, or converting terms into their lemma standard form. In block 322, the Polarity Analysis Engine processes the free text data to convert the terms in the data into their standard lemma form. In block 324, the Polarity Analysis Engine then filters the set of standard lemma terms to flag the actionable words, such as the nouns and adjectives. Other words, such a prepositions, pronouns, and articles are flagged as nonactionable and/or removed from the working set of free text data. In some embodiments, the PAS may receive the focused objective delta from the user or optionally automatically generate a focused objective delta to apply in block 326. The focused objective delta may include a percentage by which the user wishes (or the PAS recommends) to influence or change the initial target objective. Blocks 322 or block 324, or both, may include a machine learning algorithm either by itself or in combination with other processing or filtering methods. In block 326, the Polarity Analysis Engine aggregates the filtered set of standard lemma terms with the correlated structured data based on the focused objective delta.

In block 328, the Polarity Analysis Engine scores the standard lemma terms in view of its corresponding correlated structured data and the user's objectives. The scoring may be based on a machine learning algorithm that generates a word structure. In block 330, the Polarity Analysis Engine conducts a feedback analysis to analyze the distribution of the lemma terms against the distribution of the objective in the correlated structured data as well as the rarity and/or aggregate frequency of the terms. In block 332, the Polarity Analysis Engine generates polarities based on the distributed lemma terms. In some embodiments, the polarities may be assigned on a strength scale of −1.0 to +1.0 with −1.0 indicating most negative and the +1.0 indicating most positive. The PAS may store the polarities of some, but not necessarily every, term, and the polarities can be used in the creation of graphical representations of words and their corresponding predictive nature and polarity (for example, a word cloud).

In block 334, the Polarity Analysis Engine analyzes the polarities, the objective(s), and the standard correlated data to generate recommendations to present to the user that the user could take to better meet the objectives.

It is recognized that the PAS may provide some or all of the data generated to the user for review and/or to see possible input from the user. In one embodiment, the relevant information may be output via the Communications Module of the PAS. For example, the final polarities and computations used to calculate the final polarities may be sent to a device or system utilized by the user to view and for the user to make any desired changes. Also, it is recognized that a variety of embodiments may be used to conduct the analyses discussed above and that some of the blocks above may be combined, separated into sub-blocks, and rearranged to run in a different order and/or in parallel. In addition, in some embodiments, different blocks may execute on various components of the PAS or various connected systems.

B. Recommendation Generation

FIG. 4 schematically illustrates a logical flow diagram for one embodiment of an example process for generating and providing a list of recommendations to achieve a preferred amount to change an objective.

In block 402, the PAS creates an account for a user. This may be done automatically with or without a user's interaction, or programmed by a system administrator. This account will allow the user to customize its own user interface to be used with its own data and analyses.

In block 404, the PAS accesses, receives, or retrieves data, including defined objectives and user data. This information may include objective(s), general data, or customer provided data. The data may be formatted as unstructured data, including free text data, or structured data. The PAS can optionally be configured to retrieve information from another database, or the PAS can be configured to receive information directly uploaded by a user.

In block 406, the PAS prepares the data for processing, which may include automatically classifying data types (for example, ordinal, numerical, date, name, and so forth), positions, names, or deciding whether to exclude the data variable. The PAS may allow the user to verify and/or edit the automated classifications.

In block 408, the PAS analyzes the input data such that each variable, and combinations thereof, in the data set are compared to other variables, and combinations thereof, to assess the predictive strength of each variable or set of variables tied in view of the defined user objective(s), as received by the PAS, to generate a prediction model.

The PAS then may then perform one or more of three processes which can occur in any order, or not at all. The PAS may, (1) provide to the user the analysis including relevant, redundant, related, or predictiveness, (2) allow the user to select variable(s) to influence and provide recommendations for achieving the desired results, or (3) analyze additional data to (a) test the previously generated prediction model, (b) retrain the previously generated prediction model, or (c) predict an outcome with simulated data.

For providing the user the analysis, which is not shown in FIG. 4, the PAS may provide results of analysis to the user, which can include information on which parts of the data are relevant, redundant, or related, as well as which data variables, or combinations of variables, are the most to least predictive based on one or more complex statistical analyses. A variety of analyses may be used.

For analyzing additional data, which is not shown in FIG. 4, the PAS receives or accesses additional data that was not in the original data set to either, (a) test the previously generated prediction model to ensure performance, (b) to retrain the predictor by appending new data to original dataset, or (c) analyze and produce predictions for simulated data including either single data point entry or bulk data entry.

For allowing a user to select a preferred amount to change the objective, block 410, the PAS may allow the user to select a preferred amount to influence the objective, by either increasing or decreasing the value, to provide an indication of the amount other variables or scores for preferred outcomes should be adjusted. For example, to increase car sales by a certain percentage, increasing the number of car salesman or providing additional training to the car salesmen, or providing bilingual car salesmen, may be a recommended action that may be taken by the user to achieve the desired increase in car sales. This is referred to as the "focused objective delta." In some embodiments, the delta is selected by the user via a slider bar that indicates a percentage of change, but other user interface features could be used. Further, the delta may be represented in other ways, such as, for example, as a request to "increase" a positive factor or "decrease" a negative factor without providing a specific amount by which the delta should be. The PAS may also automatically create this focused objective delta and/or may enable a user to edit it. The PAS may also allow the user to select variables to exclude from the analysis, and the PAS may automatically exclude variables on its own. For example, because the age of customers cannot be changed by the user, the user may opt to exclude it from the analysis, thereby preventing any generated recommended actions from appearing that recommend the user change the customers' ages to be younger or older or within a specific range.

In block 412, the PAS analyzes associated values and inputs to determine recommendations based on selected criteria and non-excluded variables. So, after the PAS receives the input of what the desired change is, the PAS may analyze associated values and inputs to determine recommendations. The PAS may provide the automatically generated recommendations for achieving the desired changes to the user. An example embodiment of block 412 can be found in FIGS. 5 and 6 below.

In block 414, the recommendations from block 412 are formatted to be provided to the user. The PAS may optionally provide to the user a subset or group of data values for each recommendation analyzed in a presentation (for example, a word cloud) that visually represents the importance of each word or term, possibly represented by size, and an additional sentiment element, possibly represented by color.

It is recognized that a variety of embodiments may be used to conduct the analyses and that some of the processes above may be combined, separated into sub-blocks, and rearranged to run in a different order and/or in parallel. In addition, in some embodiments, different blocks may execute on various components of the PAS.

C. Free Text Data Processing

FIG. 5 schematically illustrates a logical flow diagram for one embodiment of an example process for preparing specific data for processing. FIG. 5 is a more detailed explanation of one of a possible multitude of processes of block 412 in FIG. 4, such that after the PAS allows the user to select a preferred amount to increase or decrease the objective, and may also allow the user to select predictive factors to exclude from analysis in block 410 of FIG. 4, FIG. 5 encompasses one of the events or processes of block 412.

In block 504, the PAS accesses the free text data. The unprocessed free text data is converted, in block 506, by the PAS into a lemma standard form using one or more industry standard approaches. The processing may also include one or more of, tokenizing, sentence splitting, part of speech analysis, or lemma analysis on the free text.

In block 508, the PAS filters text data for actionable words, such as nouns and/or adjectives. This filtration process flags key predictive terms and words to be used in further analysis with the remaining non-free text data.

In block 510, the PAS aggregates the filtered text data with the structured data previously included in the analysis by the user.

It is recognized that a variety of embodiments may be used to conduct the analyses and that some of the processes above may be combined, separated into sub-blocks, and rearranged to run in a different order and/or in parallel. In addition, in some embodiments, different blocks may execute on various components of the PAS. In other embodiments, any of blocks 504, 506, 508, and 510 can be implemented in any appropriate or logical order during processing, and/or in tandem. Also, in other embodiments, the PAS may choose to use different methods of processing than those listed here, as well as only using one, none, or more methods than those that appear in FIG. 5.

D. Processing and Analysis of Data

FIG. 6 schematically illustrates a logical flow diagram for one embodiment of an example process for analyzing data and generating recommendations based on polarity. FIG. 6 is an additional embodiment of block 412 in FIG. 4 such that after the PAS processes the data in FIG. 5, FIG. 6 encompasses one of the events or processes after or during the events of FIG. 5.

In block 602, after data has been processed, the PAS takes the focused user objective(s) delta and applies it against the structured data and correlated free text data, if any, and creates an aggregate of lemmas scored by the focused objective. The focused objective delta may include the percentage by which the user wishes to influence the initial target objective. The PAS uses the aggregate of lemmas to indicate how strongly they affect or influence the objective.

In block 604, the PAS analyzes the distribution of lemmas against the distribution of the focused objective(s) in the original structured data to assign polarity to the lemmas.

In block 606, the PAS uses a feedback procedure to balance the data against rarity and aggregate frequency of the data.

In block 608, the PAS creates final polarities based on the newly distributed lemmas, possibly with independent treatment of positive and negative terms. Also, the treatment of positive and negative terms may be set to a strength scale, such as −1 to 1.

In block 610, the PAS generates recommendations based on the inputs and analysis procedures. These recommendations may be used as part, of the entire, basis of the PAS' conclusions, predictions, and recommendations to the user.

It is recognized that a variety of embodiments may be used to conduct the analyses and that some of the processes above may be combined, separated into sub-blocks, and rearranged to run in a different order and/or in parallel. In addition, in some embodiments, different blocks may execute on various components of the PAS.

E. Processing and Analysis of Data

FIG. 7 is a block diagram showing one embodiment of an example process for analyzing free text data and key predictive factors to generate a graphical representation of words based on their predictive nature and polarities. The PAS may apply its architecture and processes for the automated processing of large data sets with identified key predictive factors to conduct a polarity analysis on the data sets for automatically identifying recommended actions for improvement, and to present the recommended actions in a graphical word structure that identifies words that drive positive or negative sentiment and supports the recommended actions (for example, word cloud).

The PAS uses the key predictive factors 702, focused objective delta 703, and free text data 704 as inputs. The key predictive factors 702 are produced by the PAS analysis as described herein. The focused objective delta 703 may include the percentage by which the user wishes to influence the initial target objective, and may be set by the user or is set automatically and may be updated by the user. The free text data 704 is processed and analyzed as described herein. The key predictive factors 702, the focused objective delta 703, and free text data 704 are used to create a word selection based on final polarities 706. Then, the PAS generates a graphical representation in block 708. Lastly, the PAS may provide a graphical representation, which may be a word cloud, to the user in block 710.

F. Other Processes

It is recognized that the PAS may include other processes not described above or included in the Figures. For example, in some embodiments, the PAS is further configured to run a responder score process for generating a responder score (sometimes referred to as a net promoter score) for the analyzed data (for example, user collected data 204 and/or feedback data 205) based on the user objective(s) 202. This process divides the responders into three categories: promoters, passives, and detractors. Promoters include responders who are enthusiastic towards either the company or the defined topic. Passives are responders who are indifferent, or neither enthusiastic nor unhappy, towards the particular topic. Detractors are responders who are unhappy towards the particular topic. The process may calculate the responder score by subtracting the percent of detractors from the percent of promoters, where the Responder Score=% Promoters−% Detractors.

This responder score may be used by the PAS to identify preferred target(s) to market to, or focus on. For example, a user, or business owner, may choose to focus on promoters so that the business owner can monitor the parts of the business that are most liked and improve the experience even more, or increase awareness of those parts. As another example, the PAS may use the responder score to identify preferred target(s) to or focus on as a way to minimize factors that contributed to negative sentiment. For example, a business owner may choose to focus on detractors so that the business owner can address the parts of the business that are most disliked to reduce the negative experience or impact on the responders. Either example may be used to improve the responders' experiences, at least in part or on average. It is recognized that both examples can be used separately or in tandem. User(s) may choose promoter analyses, detractor analysis, or a combination of the two, based on any number of factors. For example, some factors may include the ability to change the recommended parts, a user's cost-sensitivity, or the time it may take to implement any change(s).

VIII. USER INTERFACES

In some embodiments, the computing environment, including the PAS, includes modules for providing graphical user interfaces that allow a user to interact with the PAS via a user device. The modules may include, but are not limited to, an application on the user's device, a cloud-based program, a remote application, or a web-based interface. Example embodiments are described as follows.

FIG. 8 is a screen shot depicting one embodiment of an example user interface that generates a graphical display of various data sets associated with a specific account. A user can contribute data to an account by selecting the "Upload"

button, which allows the user to upload a locally stored file or provide a particular location to a file on a server. The user then has access to process and analyze the uploaded (or retrieved by the system) data such as "Hotel Satisfaction—Net Score." The interface generates a graphical depiction of information for each data set, which may include, for example, name of the data set, user specified objective(s) or "Targets", columns of data, rows of data, file size of the data, when the data was uploaded, and when the data was first created. The interface allows a user to sort the data sets with specified criteria (for example, name, size, date, and so forth). A user can use the search box to search the data sets. A user can set the viewer to view the data sets in a grid, list, or other format by selecting the button with four squares on the top right. The user can choose to prepare the data by selecting "Go" to verify the automated classification provided by the system and to make any necessary or preferred changes to the classification. After preparation, the button is replaced with a set of buttons, such as "Review," "Model," and "Action," that may appear when a mouse hovers over the section, or is constantly displayed to the user. The "Review" button includes similar capabilities as the "Go" button used to prepare the data. The "Model" button allows the user to design or view a previously generated model as described below. The "Action" button allows the user to create a custom target as described below. By selecting the three dots associated with each uploaded dataset, the user can view additional options to interaction with the dataset. In the present embodiment, the user may "Rename" the dataset or "Delete" the dataset. The user can also use a "Discover" button, which is not shown, to apply an associated generated prediction model. The user can use a "Predict" button, which is also not shown, to forecast hypothetical results based on the user's preferences.

FIG. 9 is a screen shot depicting one embodiment of an example user interface for uploading data or directing the system to a remote location where data is located and available for download. This screen is accessed by selecting the "Upload" button in FIG. 8. The user has several options for providing data to the system, (1) the user can drag and drop a file including data, (2) the user can select the "click here to choose a file" button to manually select the data file from a local or network storage, or (3) the user can upload data via a URL hyperlink that points to a dataset that may be stored remotely, and provide any necessary authentication for access. The system may support a variety of data formats including, for example, comma-separated values (CSV), tab separated values (TSV), a compressed file format, such as ZIP, that includes either CSV or TSV, or both, or other supported formats. By selecting "Custom Empty Values," the user can provide values that the program considers "empty" for the purposes of the analysis associated with the user imported dataset.

FIG. 10 is a screen shot depicting one embodiment of an example user interface displaying options for applying the automatic data classification, and also allowing for additional classification and customization by the user as well as the implementation of a schema. A user may access this screen by selecting "Go" to prepare the data, "Review," or selecting the dataset name, under the associated dataset as depicted in FIG. 8. The user has the ability to view the system's automated classification, which includes information such as, but not limited to, the survey questions made available to the user's customers, the position of each question on the survey relative to the others, whether the system will exclude any particular question in its analysis, any particular issues with parts of the data (for example, "overly unique," "possibly ordinal," "possibly categorical," and so forth), the data type (for example, categorical, numeric, ordinal, and so forth), what parts of the ordered or categorical are separated into its particular classification, statistics showing graphs and basic statistical analysis for each individual question, how many customers left the field empty, and how many unique responses were provided. The user may also edit several of these fields, with the additional option to exclude parts of the dataset (for example, by checking a box to exclude). A user may hover over or select the plus sign near the dataset name to access or view additional information about the dataset (for example, file size, date created, and so forth). The user may also select the "Options" tab to access several other options, such as, but not limited to, previewing the data in a row and column matrix, importing a schema, or exporting a schema. A schema includes a preset scheme of classification that the system can use to apply to the exemplary dataset. A schema may help the user apply the same preset conditions to multiple datasets with ease, rather than making changes manually in each instance. The imported and exported schema files may be in any supported format, such as, for example, CSV or JavaScript Object Notation ("JSON"). The user may select "Continue" to view the user interface in FIG. 11, which allows the user to design or select target(s) or objective(s). The user may select "Datasets" (not shown) to return to the page illustrated in FIG. 8.

FIG. 11 is a screen shot depicting one embodiment of an example user interface for inputting pre-set criteria to analyze data with additional customizations. The user may perform a Net Score Analysis for a selected target (for example, "Likelihood to recommend") based on a particular question. The user may, design a name for the target, add exclusions (for example, exclude a particular question from the analysis), select a subset target, define promoters or detractors, edit statistical variables (for example, cardinality, confidence level, cost of false positives, and/or cost of false negatives), or select whether to include empty target rows. The user may select "Submit Target" to begin the system's processing and analysis to create a prediction model. It is recognized that a variety of prediction models may be generated by one of the many modeling techniques. The user may also select "Custom Target" to view a user interface, similar to FIG. 24, which allows for additional options.

FIG. 12 is a screen shot depicting one embodiment of an example user interface that generates a graphical display of the results of an analysis. After a user selects a target and programs the desired criteria and selects "Submit Target" in FIG. 11, this page shows results of the Net Score Analysis. Information made available to the user may include, but is not limited to, net score, percent of detractors, passives, and/or promoters related to the full set of data, number of total survey questions analyzed, number of questions the system deems relevant to the analysis, number of questions the system deems predictive relevant to the analysis, sample recommendation(s) to improve net score, detailed list of predictive question with varying predictiveness, or total combinations the system analyzed and the amount of time it took the system, including any appropriate or relevant information that would be useful to the user. In some embodiments, the analysis by the PAS 108 involves the use of scoring, or calculating a Net Promoter Score for the data based on the user objective(s). This system of scoring divides a company's customers into three categories, promoters, passives, and detractors. Promoters may include customers who are enthusiastic towards the either the company or the defined topic. Passives may include customers who are indifferent, or neither enthusiastic nor unhappy, towards the particular topic. Detractors may include customers who are unhappy towards the particular topic. The Score is a subtraction of the percent of detractors from the percent of promoters, where the Score=% Promoters–% Detractors. The user also has the ability to edit, delete, or mark for future reference the exemplary target. The user may select "Datasets" (not shown) to return to the interface illustrated in FIG. 8. The user may select the dataset's name, in this example "Hotel Satisfaction—Net Score," to return to a user interface as depicted in FIG. 10. A user may hover over or select the plus sign near the dataset name to access or view additional information about the dataset (for example, file size, date created, and so forth). The user may select "Promoter" tab to view a user interface as depicted in FIG. 14. The user may select "Detractor" tab to view a user interface as depicted in FIG. 20.

FIG. 13A is a screen shot depicting one embodiment of an example user interface for the setting of a goal based on the focused data element(s). The user may select an amount the user would like the net score to change for the selected goal (for example, +5 in the exemplary example), or input the user's own desired change to the score using varying methods (for example, typing, dragging a slider, or by voice). Thus, the user interface allows the user to not only indicate the type of change but a desired amount of change. This change may be referred to as the focused objective delta. The user may exclude certain questions the system designated as predictive to the analysis. A user may choose to exclude information that the user cannot affect through any action of its own, or any affect would be too cost-prohibitive, or out of the scope of the user's abilities. For example, the user may exclude age, gender, or race because those are factors the user cannot change in the customer base, but keep in monthly price, staff service level, and class size because those are factors the user could change. Alternatively, the system can run the analysis without the user's active participation by using default settings. The user may also reset the analysis criteria to defaults. The user may select a button (not shown) to send the information to the system, or it can be sent automatically. After the information is sent, the system then calculates its analysis and provides recommendation(s) to the user.

A slider bar may also be used as a form of data input where a user may move a slider back and forth along a bar representing a desired increase or decrease of the focused data element(s). The user may move the slider bar with various forms of input; for example, but not limited to, the use of a mouse on a computer to click and drag the slider bar, or in another example, a user may touch a touch-enabled input device, such as a phone or tablet, to move the slider bar.

FIG. 13B is one embodiment of a screen shot showing multiple possible recommendations to achieve the selected goal based on the analysis performed, the user may view one or more recommendation(s) that show ways to achieve the desired change in the net score. This example shows multiple recommendations for the same set criteria in FIG. 13A. The system's recommendation(s) may include information that indicates the percentage the user may increase or decrease the frequency of types of answers received by a specific predictive question to achieve the desired goal. Color may be used as an indicator for whether to increase (for example, green) or decrease (for example, blue or purple) a specific answer to a predictive question. These answers may be influenced by actions in the physical world such as cleaning the facilities or implementing more effective training for staff.

FIG. 13C is one embodiment of a screen shot showing a word cloud pertaining to a specific recommendation, where the word cloud graphically represents the predictive language further categorized by sentiment. In some embodiments of the user interface, there may be a word cloud button that, once selected, generates graphical representation(s) of words and their corresponding predictive nature and polarity. Polarity may be depicted with positive and negative sentiment indicated with colors, such as, for example, green and purple, respectively. The words can also be depicted by size, such that larger words or terms are more predictive, or have a higher influence on the desired goal, and smaller words or terms are less predictive, or have a lower influence on the desired results, pertaining to the specific recommendation selected. For example, the purple words "parking" or "locker," assuming both are the same size, indicate negative words that have the largest negative sentiment. The word cloud may also be automatically generated.

FIG. 14 is a screen shot of one embodiment of an example user interface that generates a graphical display of additional information about survey promoters. Information may include, but is not limited to, percent of detractors, passives, and/or promoters related to the full set of data, number of total survey questions analyzed, number of questions the system deems relevant to the analysis, number of questions the system deems predictive to the analysis, and detailed list of predictive question with varying predictiveness. The user may select any number of tabs for further analysis or viewing including, but not limited to, the exemplary tab "Summary," "Model Structure," "Relevant Questions," "Quality." Some of these mentioned pages are illustrated in following figures. The user may also have the ability to edit, delete, or mark for future reference the exemplary target (not shown). The user may select the dataset's name, in this example "Hotel Satisfaction—Net Score", to return to a user interface as depicted in FIG. 10. A user may hover over or select the plus sign near the dataset name to access or view additional information about the dataset (for example, file size, date created, and so forth).

FIG. 15 is a screen shot depicting one embodiment of an example user interface that generates a graphical depiction of the system's calculated path for its prediction model for reaching the designated target goal where certain data elements hold more or less predictive value. The user interface also including a graphical representation of the strength of the predictors, one example of a way to show this is to use varying shades of color and varying combinations of the data elements. This user interface may be accessed by selecting "Model Structure" as it appears in a user interface as depicted by FIG. 14, or other similar Figures. The user interface shows the user a graphical representation of each of the analyzed predictive questions, and combinations thereof, and graphically represents strong predictiveness and weak predictiveness, which may be designated by color or shading. This may be referred to as a model graph, and is a visual representation of how the user's variables combine to identify and predict the set target. In this embodiment, the color and shading of each variable represents the relative importance or strength in predicting the set target, and the super variables (SV) represent combined driver variables or questions. The user may also view the performance of the model in identifying target respondents, where the model expects to perform with a certain percentage and/or number of results that the model are predicted positive, and are actually positive, predicted negative but are actually positive, predicted positive but are actually negative, and predicted negative and are actually negative. The user interface may also provide statistics on the model which may include, but are not limited to, accuracy, precision (for example, predicted target response(s)), efficiency, sensitivity (for example, coverage), specificity, rows analyzed, and population percent (for example, exemplary target response(s)). The user may also view specific target details on this user interface page. The user may have the option to download the graph. The user may also have the option to move the graph around a particular viewer and/or zoom in and/or out to make the graph appear larger or smaller.

FIG. 16 is a screen shot depicting one embodiment of an example user interface that generates a graphical display of specific profiles of the most positive and the most negative characteristics of individuals in a data set pertaining to the promoter analysis. This allows the user to see which types of profiles are most and least useful in achieving the objective(s). The exemplary screen shot illustrates the "Best Individuals Combinations," which may display a list of single points in the data set that represent the best individual profiles for the criteria that would be a good target respondent and the related reasoning. The table shows the profiles of the individuals who are more or less likely to be the best for the user to target to achieve its desired objective/goal initially set out for the analysis. The interface may also display relevant information related to each individual profile listed, such as, but not limited to, a set number of the top and bottom profiles for the most and least likely to be a target respondent, the exemplary target rate as calculated by the PAS, the questions the PAS deems most predictive and the answers associated with those questions, individual target rate, which is the predicted target rate for each individual profile, and the ratio to the population, which is the individual target rate divided by the exemplary target rate. The most and/or least likely individual profile to be a target respondent may be designated by color, such as green or purple, respectively. The user may have the ability to download the selected profiles as well as exclude data in the downloaded file.

FIG. 17 is a screen shot depicting one embodiment of an example user interface that generates a graphical display of how data correlates with a positive or negative influence on an objective, such as how a positive or negative survey answer correlates with the target objective. For the questions included in the PAS analysis, the answers associated with each question are analyzed and rated as to how predictive the answer tends to be in relation to the initial criteria the user set. The system can also conclude whether the answer is positive or negative. The information shown may include, but is not limited to, whether the associated answer has a "positive" or "negative" relationship to the initial objective(s), ranked in a particular order, or the strength of the relationship of the associated answer to the initial objective(s), ranked in order of strength. The relationship may be classified as "strong," "medium," or "weak." The interface may also include a filter for the user to filter the data by influence or strength, such as that the user may choose to view only the data the system designates as "strong" data, or "positive" data. Colors may be used to illustrate the positive or negative relationship, such as green or purple, respectively. The most predictive questions, as calculated by the PAS, may be marked accordingly. The user may also have access to statistical results and graphs for each of the questions to view the distribution by selecting a link or button on the page associating with each question. Data that the user may see may include, but is not limited to, data type, name, total values, empty values, unique values, graphs of the distribution, distribution against the target, or a cumulative graph, and values designated as positive or negative (also as depicted on the related graphs). A user may view the analysis for one or more questions at a time.

FIG. 18 is a screen shot depicting one embodiment of an example user interface that generates a graphical display showing how data and combinations of data correlate with a positive or negative influence on an objective, such as how two or more survey questions have a positive or negative relationship to the target objective(s). Certain question pairs may have a significant relationship to the initial target as set by the user. The relationship of each response pair may be classified as "strong," "medium," or "weak." The interface may also include a filter for the user to filter the data by influence or strength, such as that the user may choose to view only the data the system designates as "strong" data, or "positive" data. Colors may be used to illustrate the positive or negative relationship, such as green or purple, respectively. Answers to particular paired questions that the PAS has determined meets deems a predetermined threshold of a relationship may be ranked or listed such that the user may view which answers relate positively or negatively and with what strength.

FIG. 19 is a screen shot depicting one embodiment of an example user interface that generates a graphical display of the relationship between data points and how they lead to an objective pertaining to the promoter analysis. This user interface may be accessed by selecting "Relevant Questions" as it appears in a user interface as depicted by FIG. 14, or other similar figures. The graph visually depicts, visualizes the related questions, their direction, and strength of influence to the initial target as set by the user. Color and/or shading may be used to indicate the strength of the relationship to the final target, where, for example, the brighter color is more predictive. The user may also download the graph, move the graph around a particular viewer, or zoom in or out to make the graph appear larger or smaller.

FIG. 20 is a screen shot depicting one embodiment of an example user interface that generates a graphical display of the results of an analysis with respect to detractors related to criteria set. The analysis may include, but is not limited to, percent of detractors, passives, and/or promoters related to the full set of data, number of total survey questions analyzed, number of questions the system deems relevant to the analysis, number of questions the system deems predictive to the analysis, or detailed list of predictive question with varying predictiveness. The user may select any number of tabs for further analysis or viewing including, but not limited to, the exemplary tabs "Summary," "Model Structure," "Relevant Questions," "Quality" as discussed with respect to other figures. The user may also edit, delete, or mark for future reference the exemplary target objective. The user may select the dataset's name, in this example "Hotel Satisfaction—Net Score", to return to a user interface as depicted in FIG. 10. A user may hover over or select the plus sign near the dataset name to access or view additional information about the dataset (for example, file size, date created, and so forth). The user may select "Promoter" tab to view a user interface as depicted in FIG. 14.

FIG. 21 is a screen shot depicting one embodiment of an example user interface that generates a graphical display of the system's calculated path for its prediction model for reaching the designated target goal where certain data elements hold more or less predictive value related to detractors. The user interface also including a graphical representation of the strength of the predictors, one example of a way to show this would be to use varying shades of color and varying combinations of the data elements. This user interface may be accessed by selecting "Model structure" as it appears in a user interface as depicted by FIG. 20. The user interface shows the user a graphical representation of each of the analyzed predictive questions, and combinations thereof, and graphically represents strong predictiveness and weak predictiveness, which may be designated by color or shading. This may be referred to as a model graph, and is a visual representation of how the user's variables combine to identify and predict the set target. In this embodiment, the color and shading of each variable represents the relative importance or strength in predicting the set target, and the super variables ("SV") represent combined driver variables or questions that have a strong predictive effect or the target objectives. The user may also view the performance of the model in identifying target respondents, where the model expects to perform with a certain percentage and/or number of results that the model predicted are actually positive, predicted negative but is actually positive, predicted positive but is actually negative, and predicted negative and is actually negative. The user interface may also provide statistics on the model which may include, but is not limited to, accuracy, precision (for example, predicted target response(s)), efficiency, sensitivity (for example, coverage), specificity, rows analyzed, and population percent (for example, exemplary target response(s)). The user may also view specific target details on this user interface page. The user may have the option to download the graph. The user may also have the option to move the graph around a particular viewer and/or zoom in and/or out to make the graph appear larger or smaller.

FIG. 22 is a screen shot depicting one embodiment of an example user interface that generates a graphical display of specific profiles of the most positive and the most negative characteristics of individuals in a data set pertaining to the detractor analysis. This allows the user to see which types of profiles are most and least useful in achieving the objective(s). The exemplary screen shot illustrates the "Best Individuals Combinations," which may display a list of single points in the data set that represent the best individual profiles for the criteria that would be a good target respondent and the related reasoning. The table may show the profiles of the individuals who are more or less likely to be the best for the user to target to achieve its desired objective/goal initially set out for the analysis. The interface may also display relevant information related to each individual profile listed, such as, but not limited to, a set number of the top and bottom profiles for the most and least likely to be a target respondent, the exemplary target rate as calculated by the PAS, the questions the PAS deems most predictive and the answers associated with those questions, individual target rate, which is the predicted target rate for each individual profile, and the ratio to the population, which is the individual target rate divided by the exemplary target rate. The most and/or least likely individual profile to be a target respondent may be designated by color, such as green or purple, respectively. The user may have the ability to download the selected profiles as well as exclude data in the downloaded file.

FIG. 23 is a screen shot depicting one embodiment of an example user interface, similar to FIG. 19 that generates a graphical representation of the relationship between data element and how they lead to an objective pertaining to the detractor analysis. This user interface may be accessed by selecting "Relationships" as it appears in a user interface as depicted by FIG. 20, or other similar figures. The relationships graph visually depicts the related questions, their direction, and strength of influence to the initial target as set by the user. Color and/or shading may be used to indicate the strength of the relationship to the final target, where, for example, the brighter color is more predictive. The user may also download the graph, move the graph around a particular viewer, or zoom in and/or out to make the graph appear larger or smaller.

FIG. 24 is a screen shot depicting one embodiment of an example user interface allowing for the input of custom criteria for analyzing the data. The user may perform an analysis for a target based on but not limited to, selecting a target variable, selecting target question response(s), designating a name for the target, adding exclusions (for example, exclude a particular question from the analysis), selecting a subset of data, edit any statistical parameters (for example, cardinality, confidence level, cost of false positives, and/or cost of false negatives), and/or deciding whether to include empty target rows. The user may select "Submit Target" (not shown) to begin the system's processing and analysis to create a prediction model. The user may also select "Net Score Analysis" to view a user interface, similar to FIG. 11, which allows for different type of analysis options.

FIG. 25 is a screen shot depicting one embodiment of an example user interface that generates a graphical display of the summary of predictive results based on inputs. Example shows a graphical representation of the most stable variables for predicting the target objective(s). Example also shows a graphical representation of the exemplary target. After a user selects a target and programs the desired criteria and selects "Submit Target" in FIG. 29, this page appears to show results of the analysis. Information made available to the user may include, but is not limited to, title of test run as previously set, predictive variables, which are the more important questions for predicting the set target related to the tested set of data, best group most likely to match the target response, best individual most likely to match the target response, data quality for prediction (for example, any scale of either 1-10, 0-100%, or 1-5 stars, and so forth), prediction details, including the coverage as well the total values the prediction model covers over the total number of targets, the factor of efficiency based on predicted target responses over exemplary target values, or including any appropriate or relevant information that would be useful to the user. The user may select any number of tabs for further analysis or viewing including, but not limited to, the exemplary tabs "Summary," "Model Structure," "Relevant Questions", "Quality," and/or "Validate." The user may also select any number of tabs for further analysis or viewing including, but not limited to, the exemplary tabs "Model," and/or "Action." Some of these mentioned pages are illustrated in following figures. In some embodiments, the user may also have the ability to edit, delete, or mark for future reference the exemplary target objective. The user may select "Datasets" to return to the page illustrated in FIG. 8. The user may select the dataset's name, in this example "ExampleDataSet," to return to a user interface as depicted in FIG. 29. A user may hover over or select the plus sign near the dataset name to access or view additional information about the dataset (for example, file size, date created, and so forth).

FIG. 26 is a screen shot depicting one embodiment of an example user interface that generates a graphical display of predictive details and statistics of an analysis, also illustrating which data elements are more or less predictive using color and combination. This user interface may be accessed by selecting "Model Structure" as it appears in a user interface as depicted by FIG. 25, or other similar figures. The user interface shows the user a graphical representation of each of the analyzed predictive questions, and combinations thereof, and shows strong predictiveness and weak predictiveness, which may be designated by color or shading. This may be referred to as a model graph, and is a visual representation of how the user's variables combine to identify and predict the set target. In this embodiment, the color and shading of each variable represents the relative importance or strength in predicting the set target, and the super variables represent combined driver variables that have predictive effect or the target objective. The user may also view the performance of the model in identifying target respondents, where the model expects to perform with a certain percentage and/or number of results that the model predicted positive and is actually positive, predicted negative and is actually positive, predicted positive and is actually negative, and predicted negative and is actually negative. The user interface may also provide statistics on the model which may include, but is not limited to, accuracy, precision (for example, predicted target response(s)), efficiency, sensitivity (for example, coverage), specificity, rows analyzed, and population percent (for example, exemplary target response(s)). The user may also view specific target details on this user interface page. The user may have the option to download the graph. The user may also have the option to move the graph around a particular viewer and/or zoom in and/or out to make the graph appear larger or smaller.

FIG. 27 is a screen shot depicting one embodiment of an example user interface that generates a graphical display of specific profiles of the most positive and the most negative characteristics of individuals in a data set pertaining to the promoter analysis. The exemplary screen shot illustrates the "Best Individuals Combinations," which may include a list of single points in the data set that represent the best individual profiles that show who is likely to be a target respondent and why. The table may show the profiles of the individuals who are more or less likely to be the best for the user to target to achieve its desired objective/goal initially set out for the analysis. The interface may also display relevant information related to each individual profile listed, such as, but not limited to, a set number of the top and bottom profiles for the most and least likely to be a target respondent, the exemplary target rate as calculated by the PAS, the questions the PAS deems most predictive and the answers associated with those questions, individual target rate, which is the predicted target rate for each individual profile, and the ratio to the population, which is the individual target rate divided by the exemplary target rate. The most and/or least likely individual profile to be a target respondent may be designated by color, such as green or purple, respectively. The user may have the ability to download the selected profiles as well as exclude data in the downloaded file.

FIG. 28 is a screen shot depicting one embodiment of an example user interface that generates a graphical display of the relationship between data points and how they lead to an objective. This user interface may be accessed by selecting "Relevant Variables" as it appears in a user interface as depicted by FIG. 25, or other similar figures. The relationships graph visually depicts the related questions, their direction, and strength of influence to the initial target as set by the user. Color and/or shading may be used to indicate the strength of the relationship to the final target, where, for example, the brighter color is more predictive. The user may also download the graph, move the graph around a particular viewer, or zoom in and/or out to make the graph appear larger or smaller.

FIG. 29 is a screen shot depicting one embodiment of an example user interface for setting a goal based on focused elements of data and recommendations. The user may select the focused objective delta, or an amount the user would like the net score to change for the selected goal, the net score (for example, +5 in this embodiment) or input the user's own desired change to the score using varying methods (for example, typing, dragging a slider, or by voice). Thus, the user interface allows the user to not only indicate the type of change but a desired amount of change. The user may exclude certain questions the system designated as predictive to the analysis. A user may choose to exclude information that the user cannot affect through any action of its own, or any affect would be too cost-prohibitive, or out of the scope of the user's abilities. For example, the user may exclude age, gender, or race since those are factors the user cannot change in the customer data, but keep in monthly price, staff service level, and class size since those are factors the user could change. In this example, the user excludes two variables, "relationship" and "marital-status." The user may select "Apply" to send the information to the system to calculate its analysis and provide recommendation(s) to the user. Alternatively, the system can run the analysis without the user's active participation. The user may also reset the analysis criteria to defaults. The system's recommendation(s) may show information to the user that would indicate by what percentage to increase or decrease the types of answers received by a specific predictive question. Color may be used as an indicator for whether to increase (for example, green) or decrease (for example, blue or purple) a specific answer to a predictive question. These answers may be influenced by actions in the physical world such as cleaning the facilities or implementing more effective training for staff.

FIG. 30A is a screen shot depicting one embodiment of an example user interface for the entry of a single data point prediction based on customizable criteria and a previously generated model. A test is performed with the previously generated prediction model created by the PAS on the new single data point entered. The output results may appear somewhere on the page, with each additional test also appearing in any particular order or sorting arrangement. The results may also list the input prediction criteria for the user's reference. The user may also discard at least one test to all tests if the user chooses. The output results may include whether the tested data returns a true or false value based on whether the respondent meets the set target criteria (for example, would lead to a car sale). The output results also may include a confidence level indicating the statistical certainty of the model as applied to the respective input data. The user may also see what predictor it will be validating by name.

FIG. 30B is a screen shot depicting one embodiment of an example user interface for the entry of bulk data point prediction based on customizable criteria and a previously generated model. By selecting "Bulk Prediction," a user is directed to a page to upload or provide data to the PAS in the form of a file including multiple responses to the prediction questions in order to get a prediction for each respondent in a row. The user may upload or provide data to the system by, (1) dragging and dropping a file including data, (2) selecting the "Choose a File" button to manually select the data file from a local or network storage, (3) uploading data via a URL hyperlink that points to a dataset that may be stored remotely, and provide any necessary authentication for access, or (4) using any other appropriate method. The data the system receives may be in a format the system supports. Formats may include, comma-separated values ("CSV"), tab separated values ("TSV"), a compressed file format, such as ZIP, that includes either CSV or TSV, or both, or other supported formats. In some embodiments, the user may also specify the format that the system outputs result, such as a "compact" format, only providing essential data, or "full" format, providing all, or nearly all, data available. The results indicate why the individual received the given prediction by ranking the importance of each response to the prediction questions. The user may also see what predictor it will be validating by name. The PAS may also export by saving to a cloud storage endpoint.

FIG. 30C is a screen shot depicting one embodiment of an example user interface for the entry of additional data to test or retrain a prediction model. By selecting "Validate," a user is directed to a page to use additional data to test the model and to check or calibrate the model's performance. The user may also use this interface to retrain the predictor by appending uploaded new data to the original dataset. The user may upload or provide data to the system by, (1) dragging and dropping a file including data, (2) selecting the "Choose a File" button to manually select the data file from a local or network storage, (3) uploading data via a URL hyperlink that points to a dataset that may be stored remotely, and provide any necessary authentication for access, or (3) using any other appropriate method. The system may accept a variety of formats including, comma-separated values ("CSV"), tab separated values ("TSV"), a compressed file format, such as ZIP, that includes either CSV or TSV, or both, or other supported formats. The user may also see what predictor it will be validating by name.

IX. COMPUTING SYSTEM

In some embodiments, any of the systems, servers, or components referenced herein may take the form of a computing system as shown in FIG. 31 which illustrates a block diagram of one embodiment of a type of computing system 802. The exemplary computing system 802 includes a central processing unit ("CPU") 810, which may include one or more conventional microprocessors that comprise hardware circuitry configured to read computer-executable instructions and to cause portions of the hardware circuitry to perform operations specifically defined by the circuitry. The computing system 802 may also include a memory 812, such as random access memory ("RAM") for temporary storage of information and read only memory ("ROM") for permanent storage of information, which may store some or all of the computer-executable instructions prior to being communicated to the processor for execution. The computing system may also include one or more mass storage devices 804, such as a hard drive, diskette, CD-ROM drive, a DVD-ROM drive, or optical media storage device, that may store the computer-executable instructions for relatively long periods, including, for example, when the computer system is turned off. Typically, the modules of the computing system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system may be combined into fewer components and modules or further separated into additional components and modules. The illustrated structure of the computing system 802 may also be used to implement other computing components and systems described in the disclosure. It is recognized that the components discussed herein may be implemented as different types of components. For example, a server may be implemented as a module executing on a computing device, a mainframe may be implemented on a non-mainframe server, a server or other computing device may be implemented using two or more computing devices, and/or various components could be implemented using a single computing device.

Also, it is recognized that a variety of embodiments may be used and that some of the blocks in FIG. 31 may be combined, separated into sub-blocks, and rearranged to run in a different order and/or in parallel.

In one embodiment, the computing system 802 is a server, a workstation, a mainframe, a minicomputer. In other embodiments, the system may be a personal computer that is IBM, Macintosh, or Linux/Unix compatible, a laptop computer, a tablet, a handheld device, a mobile phone, a smart phone, a smart watch, a personal digital assistant, a car system, a tablet or other user device. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth.

The computing system 802 may be generally controlled and coordinated by operating system software, such as Windows 95, Windows 98, Windows NT, Windows 2000, Windows XP, Windows Vista, Windows 7, Windows 8, Windows 10, Unix, Linux, SunOS, Solaris, Maemo, MeeGo, BlackBerry Tablet OS, Android, webOS, Sugar, Symbian OS, MAC OS X, or iOS or other operating systems. In other embodiments, the computing system 802 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 802 includes one or more commonly available input/output ("I/O") devices and interfaces 808, such as a keyboard, mouse, touchpad, speaker, microphone, or printer. In one embodiment, the I/O devices and interfaces 808 include one or more display device, such as a touchscreen, display or monitor, which allows the visual presentation of data to a user. More particularly, a display device provides for the presentation of GUIs, application software data, and multimedia presentations, for example. The central processing unit 810 may be in communication with a display device that is configured to perform some of the functions defined by the computer-executable instructions. For example, some of the computer-executable instructions may define the operation of displaying to a display device, an image that is like one of the screen shots included in this application. The computing system may also include one or more multimedia devices 806, such as speakers, video cards, graphics accelerators, and microphones, for example. A skilled artisan would appreciate that, in light of this disclosure, a system, including all hardware components, such as the central processing unit 810, display device, memory 812, and mass storage device 804 that are necessary to perform the operations illustrated in this application, is within the scope of the disclosure.

In the embodiment of FIG. 31, the I/O devices and interfaces provide a communication interface to various external devices and systems. The computing system may be electronically coupled to a network 818, which comprises one or more of a LAN, WAN, the Internet, or cloud computing networks, for example, via a wired, wireless, or combination of wired and wireless, communication links. The network communicates with various systems or other systems via wired or wireless communication links 820, as well as various data sources 822.

Information may be provided to the computing system 802 over the network from one or more data sources including, for example, user 104 or survey database 106. In addition to the sources that are illustrated in FIGS. 1A and 1B, the network may communicate with other data sources or other computing devices such as a third party survey provider system or database, for example. The data sources may include one or more internal or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, or a record-based database.

In the embodiment of FIG. 31, the computing system 802 also includes a PAS 814, which may be executed by the CPU 810, to run one or more of the processes discussed herein. This system may include, by way of example, components, such as software components, object-oriented software components, class components, task components, processes, functions, attributes, procedures, subroutines, segments of program code, drivers, firmware, microcode, circuitry, data, databases, data structures, tables, arrays, or variables. In one embodiment, the PAS 814 may include one or more of the modules shown in block 210 in FIG. 2.

Embodiments can be implemented such that all functions illustrated herein are performed on a single device, while other embodiments can be implemented in a distributed environment in which the functions are collectively performed on two or more devices that are in communication with each other. Moreover, while the computing system has been used to describe one embodiment of a PAS 210, it is recognized that the user or customer systems may be implemented as computing systems as well.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, or may be invoked in response to detected events or interrupts. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

X. ADDITIONAL EMBODIMENTS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following.

What is claimed is:

1. A prescriptive analytics system for conducting a polarity analysis on unstructured, free text data, the prescriptive analytics system comprising:
   a first electronic database storing a set of response data, the set of response data comprising a structured data set and a free text data set, and wherein the set of response data is based at least partly on an aggregated customer feedback dataset;
   a second electronic database storing a first objective corresponding to the set of response data, the first objective selected by a user, wherein the first objective is associated with one or more objective values such that each objective value is associated with a degree of impact on one or more outcomes, wherein the one or more outcomes are based at least partly on the first objective selected by the user;
   a hardware processor is configured to execute computer-executable instructions in order to:
      access from the first electronic database the set of response data;
      analyze the structured data set of the structured data to identify key predictive factors within the structured data set that are correlated to the first objective and indicate one or more behavior patterns associated with the first objective;
      generate a correlated structured data set from the structured data set using the identified key predictive factors;
      convert a plurality of terms within the free text data set of the response data into a plurality of lemmas corresponding to the plurality of terms to generate a standardized lemma data set;
      filter the standardized lemma data set to remove terms that are not associated with actionable words to create a filtered lemma data set, wherein actionable words include nouns and adjectives selected by the user;
      aggregate the filtered lemma data set with the correlated structured data set;
      generate scores for the filtered lemma data set in view of the first objective to create a scored lemma data set;

analyze the distribution of the scored lemma data set against a distribution of the first objective in the correlated structured data set to determine a first number of occurrences of lemmas of the plurality of lemmas associated with a positive objective value and to determine a second number of occurrences of lemmas of the plurality of lemmas associated with a negative objective value;

balance the distribution of the scored lemma data set against aggregate frequency of terms in the scored lemma data set to create a distributed lemma data set; and assign polarity values to terms in the distributed lemma data set, wherein the polarity values indicate whether each of the terms is a positive term or a negative term, based at least partly on a determination of the terms as being associated with a degree of impact on one or more outcomes;

generate a recommendation action based at least in part on the polarity values.

2. The computing system of claim 1, wherein the hardware processor is configured to execute computer-executable instructions in order to generate recommendations for achieving an improvement to the first objective using the polarity values and the distributed lemma data set.

3. The computing system of claim 1, wherein the generation of scores for the filtered lemma data set in view of the first objective to create a scored lemma data set includes incorporating a user-specified amount of requested change in the objective.

4. The computing system of claim 3, wherein the user-specified amount of requested changes in the objective corresponds to a change to increase the amount of a positive response.

5. The computing system of claim 3, wherein the user-specified amount of requested changes in the objective corresponds to a change to decrease the amount of a negative response.

6. The computing system of claim 1, wherein the hardware processor is configured to generate a data packet that includes a graphical representation of at least a subset of the distributed lemma data set that includes a graphical representation of whether a term in the at least a subset is tied to a negative sentiment or a positive sentiment, the data packet configured for display on a remote computing device.

7. The computing system of claim 1, wherein the hardware processor is configured to generate a data packet that includes a graphical representation of at least a subset of the distributed lemma data set that includes a graphical representation of the frequency and strength of terms in the subset, the data packet configured for display on a remote computing device.

8. The computing system of claim 1, wherein the hardware processor is configured to generate a data packet that includes a graphical representation of at least a subset of the distributed lemma data set that includes a graphical representation of whether a term in the subset is tied to a negative sentiment or a positive sentiment and the frequency and strength of terms in the subset, the data packet configured for display on a remote device.

9. A computer-implemented method of conducting a polarity analysis on unstructured, free text data, the computer-implemented method comprising:

as implemented by one or more computing devices configured with specific computer-executable instructions,
accessing from a first electronic database a set of response data that includes a structured data set and an unstructured data set, wherein the set of response data is based at least partly on an aggregated customer feedback dataset;

analyzing the structured data set to identify key predictive factors within the structured data set that are correlated to a first objective and indicate one or more behavior patterns associated with the first objective, wherein the first objective corresponds to the set of response data and is selected by a user, and wherein the first objective is associated with one or more objective values such that each objective value is associated with a degree of impact on one or more outcomes, wherein the one or more outcomes are based at least partly on the first objective selected by the user;

generating a correlated structured data set from the structured data set using the identified key predictive factors;

converting a plurality of terms within the free text data set of the response data into a plurality of lemmas corresponding to the plurality of terms to generate a standardized lemma data set;

filtering the standardized lemma data set to remove terms that are not associated with actionable words to create a filtered lemma data set, wherein actionable words include nouns and adjectives selected by the user;

aggregating the filtered lemma data set with the correlated structured data set;

generating scores for the filtered lemma data set in view of the first objective to create a scored lemma data set;

analyzing the distribution of the scored lemma data set against a distribution of the first objective in the correlated structured data set to determine a first number of occurrences of lemmas of the plurality of lemmas associated with a positive objective value and to determine a second number of occurrences of lemma of the plurality of lemmas associated with a negative objective value;

balancing the distribution of the scored lemma data set against rarity and aggregate frequency of terms in the scored lemma data set to create a distributed lemma data set; and assigning polarity values to terms in the distributed lemma data set, wherein the polarity values indicate whether each of the terms is a positive term or a negative term, based at least partly on a determination of the terms as being associated with a degree of impact on one or more outcomes;

generating a recommendation action based at least in part on the polarity values.

10. The computer-implemented method of claim 9, further comprising generating recommendations for achieving an improvement to the first objective using the polarity values and the distributed lemma data set.

11. The computer-implemented method of claim 9, wherein the generation of scores for the filtered lemma data set in view of the first objective to create a scored lemma data set includes incorporating a user-specified amount of requested change in the objective.

12. The computer-implemented method of claim 11, wherein the user-specified amount of requested changes in the objective corresponds to a change to increase the amount of a positive response.

13. The computer-implemented method of claim 11, wherein the user-specified amount of requested changes in the objective corresponds to a change to decrease the amount of a negative response.

14. The computer-implemented method of claim 9, further comprising generating a data packet that includes a graphical representation of at least a subset of the distributed lemma data set that includes a graphical representation of whether a term in the at least a subset is tied to a negative sentiment or a positive sentiment, the data packet configured for display on a remote computing device.

15. The computer-implemented method of claim 9, further comprising generating a data packet that includes a graphical representation of at least a subset of the distributed lemma data set that includes a graphical representation of the frequency and strength of terms in the subset, the data packet configured for display on a remote computing device.

16. The computer-implemented method of claim 9, further comprising generating a data packet that includes a graphical representation of at least a subset of the distributed lemma data set that includes a graphical representation of whether a term in the subset is tied to a negative sentiment or a positive sentiment and the frequency and strength of terms in the subset, the data packet configured for display on a remote device.

17. Non-transitory computer storage having stored thereon a computer program, the computer program including executable instructions that instruct a computer system to at least:
- access from a first electronic database a set of response data that includes a structured data set and an unstructured data set, wherein the set of response data is based at least partly on an aggregated customer feedback dataset;
- analyze the structured data set to identify key predictive factors within the structured data set that are correlated to a first objective and indicate one or more behavior patterns associated with the first objective, wherein the first objective corresponds to the set of response data and is selected by a user, and wherein the first objective is associated with one or more objective values such that each objective value is associated with a degree of impact on one or more outcomes, wherein the one or more outcomes are based at least partly on the first objective selected by the user;
- generate a correlated structured data set from the structured data set using the identified key predictive factors;
- convert a plurality of terms within the free text data set of the response data into a plurality of lemmas corresponding to the plurality of terms to generate a standardized lemma data set;
- filter the standardized lemma data set to remove terms that are not associated with actionable words to create a filtered lemma data set, wherein actionable words include nouns and adjectives selected by the user;
- aggregate the filtered lemma data set with the correlated structured data set;
- generate scores for the filtered lemma data set in view of the first objective to create a scored lemma data set;
- analyze the distribution of the scored lemma data set against a distribution of the first objective in the correlated structured data set to determine a first number of occurrences of lemmas of the plurality of lemmas associated with a positive objective value and to determine a second number of occurrences of lemma of the plurality of lemmas associated with a negative objective value;
- balance the distribution of the scored lemma data set against rarity and aggregate frequency of terms in the scored lemma data set to create a distributed lemma data set; and
- assign polarity values to terms in the distributed lemma data set, wherein the polarity values indicate whether each of the terms is a positive term or a negative term based at least partly on a determination of the terms as being associated with a degree of impact on one or more outcomes;
- generate a recommendation action based at least in part on the polarity values.

18. The non-transitory computer storage of claim 17, the executable instructions further comprising generating recommendations for achieving an improvement to the first objective using the polarity values and the distributed lemma data set.

19. The non-transitory computer storage of claim 17, wherein the generation of scores for the filtered lemma data set in view of the first objective to create a scored lemma data set includes incorporating a user-specified amount of requested change in the objective.

20. The non-transitory computer storage of claim 19, wherein the user-specified amount of requested changes in the objective corresponds to a change to increase the amount of a positive response.

21. The non-transitory computer storage of claim 19, wherein the user-specified amount of requested changes in the objective corresponds to a change to decrease the amount of a negative response.

22. The non-transitory computer storage of claim 17, the executable instructions further comprising generating a data packet that includes a graphical representation of at least a subset of the distributed lemma data set that includes a graphical representation of whether a term in the subset is tied to a negative sentiment or a positive sentiment, the data packet configured for display on a remote computing device.

23. The non-transitory computer storage of claim 17, the executable instructions further comprising generating a data packet that includes a graphical representation of at least a subset of the distributed lemma data set that includes a graphical representation of the frequency and strength of terms in the subset, the data packet configured for display on a remote computing device.

24. The non-transitory computer storage of claim 17, the executable instructions further comprising generating a data packet that includes a graphical representation of at least a subset of the distributed lemma data set that includes a graphical representation of whether a term in the subset is tied to a negative sentiment or a positive sentiment and the frequency and strength of terms in the subset, the data packet configured for display on a remote device.

* * * * *